(12) United States Patent
Giachi et al.

(10) Patent No.: US 12,734,616 B2
(45) Date of Patent: Sep. 15, 2026

(54) METHOD FOR QUALITY CONTROL OF A WELDING JOINT BETWEEN A PAIR OF ENDS OF CONDUCTING ELEMENTS OF AN INDUCTIVE WINDING OF A STATOR

(71) Applicant: ATOP S.P.A., Barberino Tavarnelle (IT)

(72) Inventors: Massimiliano Giachi, San Gimignano (IT); Emanuele Angelini, Buonconvento (IT)

(73) Assignee: ATOP S.P.A., Barberino Tavarnelle (IT)

( * ) Notice: Subject to any disclaimer, the term of this patent is extended or adjusted under 35 U.S.C. 154(b) by 210 days.

(21) Appl. No.: 18/840,233

(22) PCT Filed: Mar. 7, 2023

(86) PCT No.: PCT/IB2023/052134
§ 371 (c)(1),
(2) Date: Aug. 21, 2024

(87) PCT Pub. No.: WO2023/170570
PCT Pub. Date: Sep. 14, 2023

(65) Prior Publication Data

US 2025/0162086 A1 May 22, 2025

(30) Foreign Application Priority Data

Mar. 8, 2022 (IT) ........................ 102022000004301

(51) Int. Cl.
*B23K 31/12* (2006.01)
*G01N 21/88* (2006.01)
(Continued)

(52) U.S. Cl.
CPC ....... *B23K 31/125* (2013.01); *G01N 21/8851* (2013.01); *G01N 21/9515* (2013.01);
(Continued)

(58) Field of Classification Search
CPC ............. B23K 31/125; G01N 21/8851; G01N 21/9515; G01N 2021/8887; G06T 7/0004;
(Continued)

(56) References Cited

U.S. PATENT DOCUMENTS 10,556,297 B2 * 2/2020 Kamiyama .......... B23K 31/125
12,373,940 B2 * 7/2025 Schmid ..................... G06T 7/11
(Continued)

FOREIGN PATENT DOCUMENTS

WO 2004109268 A1 12/2004

OTHER PUBLICATIONS

Yang, L., Li, E., Long, T. et al. A welding quality detection method for arc welding robot based on 3D reconstruction with SFS algorithm. Int J Adv Manuf Technol 94, 1209-1220 (2018).*
(Continued)

*Primary Examiner* — Shefali D Goradia
(74) *Attorney, Agent, or Firm* — Carlson, Gaskey & Olds, P.C.

(57) ABSTRACT

A method for quality control of a welding joint between a pair of ends of conducting elements of an inductive winding of a stator, the method being performed by a computer and comprising the steps of:
- acquiring a 3D reconstruction of the welding joint;
- extracting a plurality of 2D grayscale blob areas from the 3D reconstruction of the welding joint;
- converting the plurality of 2D grayscale blob areas to a function of 2D grayscale blob areas which depends on a distance from a peak of the welding joint with respect to each 2D grayscale blob area;
- calculating a respective first derivative of the function of 2D grayscale blob areas;
- calculating a respective second derivative of the function of 2D grayscale blob areas; and (Continued)

seeking instability peaks in a trend of the second derivative of the function of 2D grayscale blob areas.

7 Claims, 26 Drawing Sheets

(51) Int. Cl.
*G01N 21/95* (2006.01)
*G06T 7/00* (2017.01)

(52) U.S. Cl.
CPC .... *G06T 7/0004* (2013.01); *G01N 2021/8887* (2013.01); *G06T 2200/04* (2013.01); *G06T 2207/30152* (2013.01)

(58) Field of Classification Search
CPC ....... G06T 2200/04; G06T 2207/30152; G06T 2207/10028; G06T 3/40; G06T 7/11
See application file for complete search history.

(56) References Cited

U.S. PATENT DOCUMENTS

| | | | | |
|---|---|---|---|---|
| 2013/0075371 | A1* | 3/2013 | De Souza | B23K 31/125 219/109 |
| 2024/0337604 | A1* | 10/2024 | Sakai | G01N 21/88 |
| 2025/0144749 | A1* | 5/2025 | Giachi | B23K 31/125 |
| 2025/0162086 | A1* | 5/2025 | Giachi | B23K 31/125 |

OTHER PUBLICATIONS

Li, Xinde, et al. "Automatic welding seam tracking and identification." IEEE Transactions on industrial electronics 64.9 (2017): 7261-7271.*

Vater, Johannes, et al., Quality Control and Fault Classification of Laser Welded Hairpins in Electrical Motors, Dec. 18, 2020 (Dec. 18, 2020), XP055934462.

Indian Examination Report for Indian Patent Application No. 202417075081 dated Mar. 11, 2026.

Italian Search Report for Italian Application No. IT102022000004301 completed on Oct. 25, 2022.

International Search Report and Written Opinion for International Application No. PCT/IB2023/052134 completed on May 23, 2023.

Vater, Johannes, et al., Quality Control and Fault Classification of Laser Welded Hairpins in Electrical Motors, Dec. 18, 2020 (Dec. 18, 2020), XP055934462, Retrieved from the Internet: URL: https://ieeexplore.ieee.org/stampPDF/getPDF.jsp?tp=&arnumber=9287701&ref=aHR0cHM6Ly9pZWVleHBsb3JILmlIZWUub3JnL2RvY3VtZW50LzkyODc3MDE=, [retrieved on Jun. 22, 2022], sections III-V.

Dupriez, Nataliya, OCT produces a better weld: Laser Focus World, Sep. 2019 (Sep. 2019), XP055934498, Retrieved from the Internet: URL: https://www.laserfocusworld.com/industrial-laser-solutions/article/14221414/octproduces-a-better-weld, [retrieved on Jun. 22, 2022], the whole document.

* cited by examiner 10
12
14

17
d
h
19
18
16

19
16

Sd1
19
Sd2

19

19
16

17
d
19
16

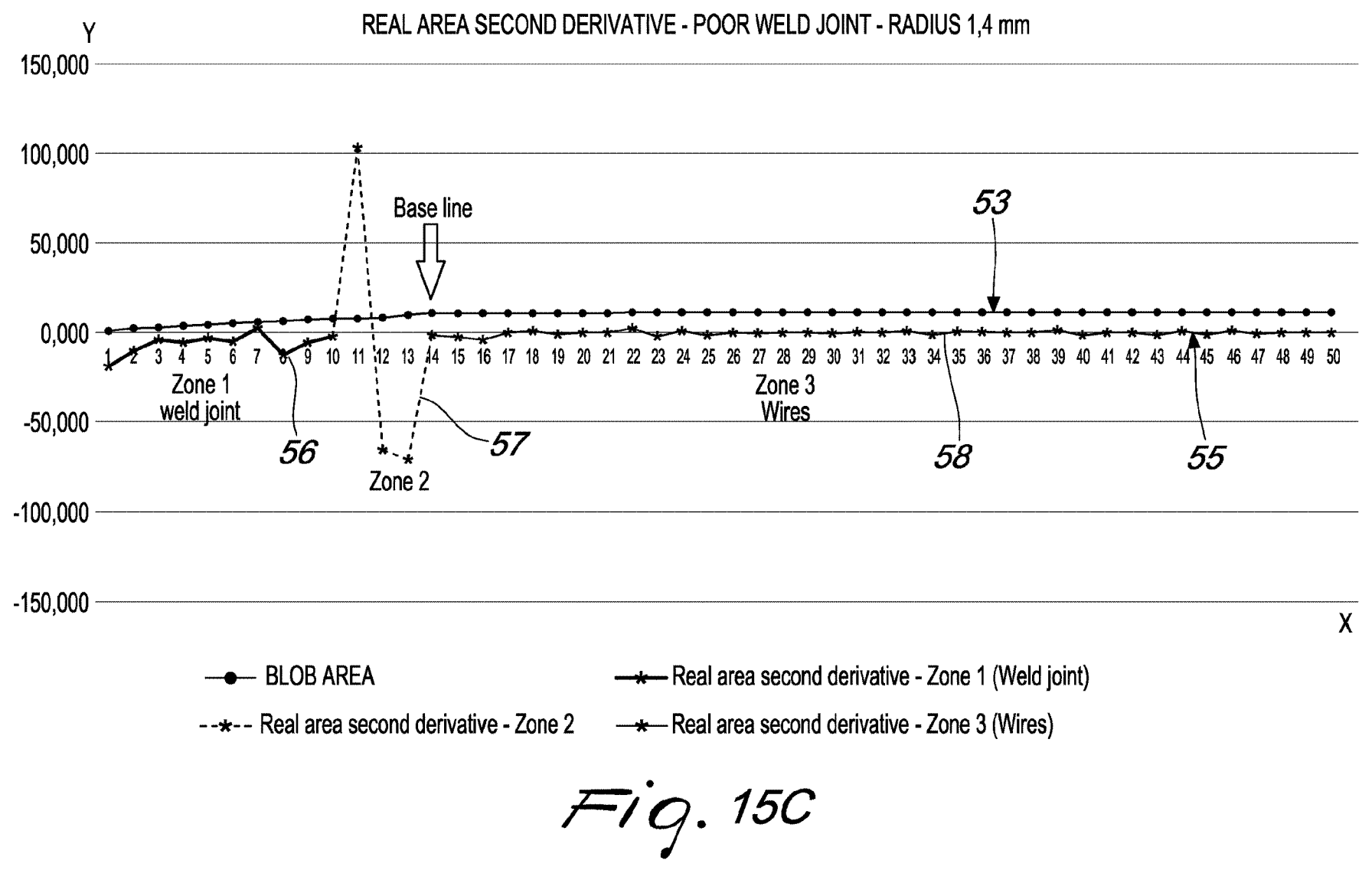

REAL AREA SECOND DERIVATIVE - POOR WELD JOINT - RADIUS 1,4 mm

Y 150,000
100,000
50,000
0,000
-50,000
-100,000
-150,000

X 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47 48 49 50

Base line

Zone 1 weld joint

Zone 2

Zone 3 Wires

53

55

56

57

58

BLOB AREA

Real area second derivative - Zone 1 (Weld joint)

Real area second derivative - Zone 2

Real area second derivative - Zone 3 (Wires)

Fig. 15C

METHOD FOR QUALITY CONTROL OF A WELDING JOINT BETWEEN A PAIR OF ENDS OF CONDUCTING ELEMENTS OF AN INDUCTIVE WINDING OF A STATOR

The present invention relates to a method for quality control of a welding joint between a pair of ends (or terminals) of conducting elements of an inductive winding of a stator.

The method according to the present invention is particularly, although not exclusively, useful and practical in the area of quality control operations that follow welding operations for welding conducting elements that constitute the inductive windings of stators of electric machines, for example electric motors or electricity generators.

It is known that electric motors, dynamos, alternators and transformers comprise a core of ferromagnetic material on which windings are arranged which are made with electrical wires arranged according to a specific geometry. The circulation of an electric current in at least one of the windings determines, by electromagnetic induction, the circulation of an induced current in at least one other winding. Furthermore, between the ferromagnetic core and the respective windings, forces act on each other and are capable, for example, of turning a rotor with respect to a stator in an electric motor.

As said, the inductive windings described above are made using wires of electrically conducting material, generally copper. For specific applications, inductive windings are made using wire-like elements of electrically conducting material, conducting elements for short, which are first inserted in specific slots which are provided in the ferromagnetic core of the electric machine under construction and then mutually stably coupled at at least one end, typically with welding operations.

A typical example of these conducting elements is the "hairpin", where each one of the conducting elements is shaped like a fork. This fork has a pair of straight shanks which are mutually connected at one end by a bridge-like cross-piece. Typically the fork is shaped approximately like an upturned U with the bridge shaped like a cusp. Each shank of the fork, and therefore of the conducting element, has a free end for insertion in a respective slot of the ferromagnetic core of the electric machine. In particular, a first end of each conducting element is inserted into a respective first slot, while a second end of the same conducting element is inserted into a respective second slot, according to the desired logic for the inductive winding of the electric machine.

The insertion into the slots of the ferromagnetic core of the electric machine occurs by inserting the free ends of the conducting elements through longitudinal openings of the slots and making said free ends slide until they come out at the other end of the ferromagnetic core, in particular until a predefined external protrusion of the shanks is reached. So at one end of the ferromagnetic core, the bridges of the forks remain outside, while at the other end of the ferromagnetic core the free ends of the shanks of the forks remain outside.

After insertion, the free ends of the conducting elements are bent in order to be arranged in predetermined positions, at which they are connected with other free ends of other conducting elements through welding operations. The free ends of separate conducting elements must be adjacent and arranged according to criteria for mutual alignment that make the welding operations simple and which ensure a high stability of the connection. For example, in a pair of adjacent free ends that are to be mutually connected, the first end can have a height (i.e. external protrusion) that is slightly higher than the height (i.e. external protrusion) of the second end, so that the welding operation can make a gob of molten material of the first end fall onto the second end.

The operation to weld the free ends of the conducting elements can occur by way of various welding techniques, for example with a laser beam that strikes one or both of the free ends of the conducting elements which are arranged adjacent in order to be mutually connected. Independently of the welding technique used, the melting of the material of one or both of the ends generates a welding joint that complies with the required mechanical and electrical characteristics, and therefore closes the circuit of the inductive winding according to a predefined electrical diagram.

FIG. 3 schematically shows a welding joint 19 (the semicircular upper portion, corresponding in three dimensions to a hemispherical shape) between a pair of ends of conducting elements of a hairpin 16 of an inductive winding of a stator, and also shows the elevation or height h between the peak (the highest point) 17 of the welding joint 19 and the base (or base line) 18 of said welding joint 19. In practice, the base 18 of the welding joint 19 corresponds to the tip of the pair of ends of conducting elements of a hairpin 16 that are as yet unwelded, and the respective upper surfaces of which are perfectly coplanar.

The quality of the welding operations, and consequently the quality of welding joints between the ends of conducting elements of hairpins of an inductive winding of a stator, can be assessed on the basis of various elements, including the elevation or height h described above. In simple terms, a welding joint whose quality can be considered good if the base of the welding joint is sufficiently low not to leave a bare area, at which the welding operations have not been successful and therefore in this area one of the two ends of the conducting elements is uncovered, with the result that the electrical characteristics of the welding joint are deteriorated. As said, the above description is a simplification. In reality, a low base of the welding joint does not automatically entail a bare area. In fact, specific applications are possible where the base of the welding joint is extremely low but the entire surface at the tip of the pair of ends of conducting elements of a hairpin is perfectly welded, and so the bare area is absent.

In practice, the height h of the welding joint influences the electrical quality of the welding joint itself since this height h is an indicator of the penetration of the weld into the slot formed by coupling the ends of the conducting elements of a hairpin. Therefore, if a welding joint externally shows a correct height h, internally it has penetrated sufficiently into the slot, thus ensuring a good electrical quality and a good mechanical strength. By contrast, if a welding joint externally shows a height h that is too low, it has not penetrated sufficiently into the slot, thus worsening the electrical quality and the mechanical strength. Finally, if a welding joint externally shows a height h that is too high, it may have bubbles inside which worsen the electrical quality and the mechanical strength. In short, the value of the height h of the welding joint must remain within a fixed range in order to avoid failed penetration and prevent possible inner bubbles.

Currently, human operators, typically laboratory technicians, are used to judge the quality (including from the aesthetic point of view) of welding joints between the ends of conducting elements of hairpins of an inductive winding of a stator. In particular, these operators examine these welding joints visually, basing their judgment mainly on their own professional experience and using adapted magnifying devices (for example a digital microscope) and/or measurement devices. The objective of these quality controls performed by human operators is to verify that the welding joints between the ends of the conducting elements ensure a stable and strong bonding of said ends and that they have no aesthetic defects. The operators will discard stators with defective inductive windings, or rather inductive windings that comprise conducting elements at the end of which there are defective welds.

However, this conventional methodology is not without drawbacks, among which is the fact that these quality controls performed by human operators require long times, generate high costs and imply a high risk of inaccuracies and human error in the examination and evaluation of the welding joints.

Another drawback of this conventional methodology consists in that, in welding joints, some lateral burring is often present which further complicates the work of the operators, making the measurement of the elevation or height h between the peak of the welding joint and the base of that welding joint substantially subjective. In other words, the laboratory measurements of the welding joints are conditioned by human operators.

A further drawback of this conventional methodology consists in that the laboratory measurements of the welding joints are often performed from a single point of view. This is necessary owing to the shape structure of the stator and of the associated inductive winding: the welding joints are positioned very close to each other and therefore the impediment of the adjacent welds makes it impossible to analyze the welds inside the ring from other points of view. Obviously, a laboratory technician could sever one or more welding joints and analyze them from various points of view. However, this operation would require a great deal of time and, given that it entails cutting joints, would risk degrading the actual measurements.

The aim of the present invention is to overcome the limitations of the known art described above, by devising a method for quality control of a welding joint between a pair of ends of conducting elements of an inductive winding of a stator that makes it possible to obtain better effects than those that can be obtained with conventional solutions and/or similar effects at lower cost and with higher performance levels.

Within this aim, an object of the present invention is to conceive a method for quality control of a welding joint between a pair of ends of conducting elements of an inductive winding of a stator that makes it possible to examine and evaluate welding joints objectively and rapidly.

Another object of the present invention is to devise a method for quality control of a welding joint between a pair of ends of conducting elements of an inductive winding of a stator that makes it possible to identify the base of the welding joint, where said welding joint begins and the unwelded surface of the pair of conducting elements ends.

Another object of the present invention is to conceive a method for quality control of a welding joint between a pair of ends of conducting elements of an inductive winding of a stator that makes it possible to estimate the elevation or height h between the peak of the welding joint and the base of said welding joint.

Another object of the present invention is to conceive a method for quality control of a welding joint between a pair of ends of conducting elements of an inductive winding of a stator that makes it possible to identify the base of the welding joint with sufficient stability and confidence with respect to any errors.

Another object of the present invention is to provide a method for quality control of a welding joint between a pair of ends of conducting elements of an inductive winding of a stator that is highly reliable, easily and practically implemented, and economically competitive when compared to the known art.

This aim and these and other objects which will become better apparent hereinafter are achieved by a method for quality control of a welding joint between a pair of ends of conducting elements of an inductive winding of a stator, said method being performed by a computer, characterized in that it comprises the steps of:

acquiring a 3D reconstruction of said welding joint;

extracting a plurality of 2D grayscale blob areas from said 3D reconstruction of said welding joint, transversely sectioning said 3D reconstruction with a plurality of cutting planes arranged at a progressive distance from a peak of said 3D reconstruction, a white area of each one of said grayscale cutting planes being one of said 2D grayscale blob areas;

converting said plurality of 2D grayscale blob areas to a function of 2D grayscale blob areas which depends on a distance from a peak of said welding joint with respect to each 2D grayscale blob area, each value of said function of 2D grayscale blob areas corresponding to said white area at said distance from said peak of said welding joint;

calculating a respective first derivative of said function of 2D grayscale blob areas;

calculating a respective second derivative of said function of 2D grayscale blob areas; and seeking instability peaks in a trend of said second derivative of said function of 2D grayscale blob areas, said instability peaks being local maximum or minimum values of said second derivative, a point that follows said instability peaks corresponding to the base of said welding joint.

In an embodiment, the method described above is characterized in that it further comprises the step of:

seeking instability peaks in a trend of said first derivative of said function of 2D grayscale blob areas, said instability peaks being local maximum or minimum values of said first derivative, a point that follows said instability peaks corresponding to the base of said welding joint.

Further characteristics and advantages of the present invention will become more apparent from the description of a preferred, but not exclusive, embodiment of the method for quality control of a welding joint between a pair of ends of conducting elements of an inductive winding of a stator according to the invention, illustrated by way of non-limiting example with the assistance of the accompanying drawings wherein.

Figures 6A, 6B:
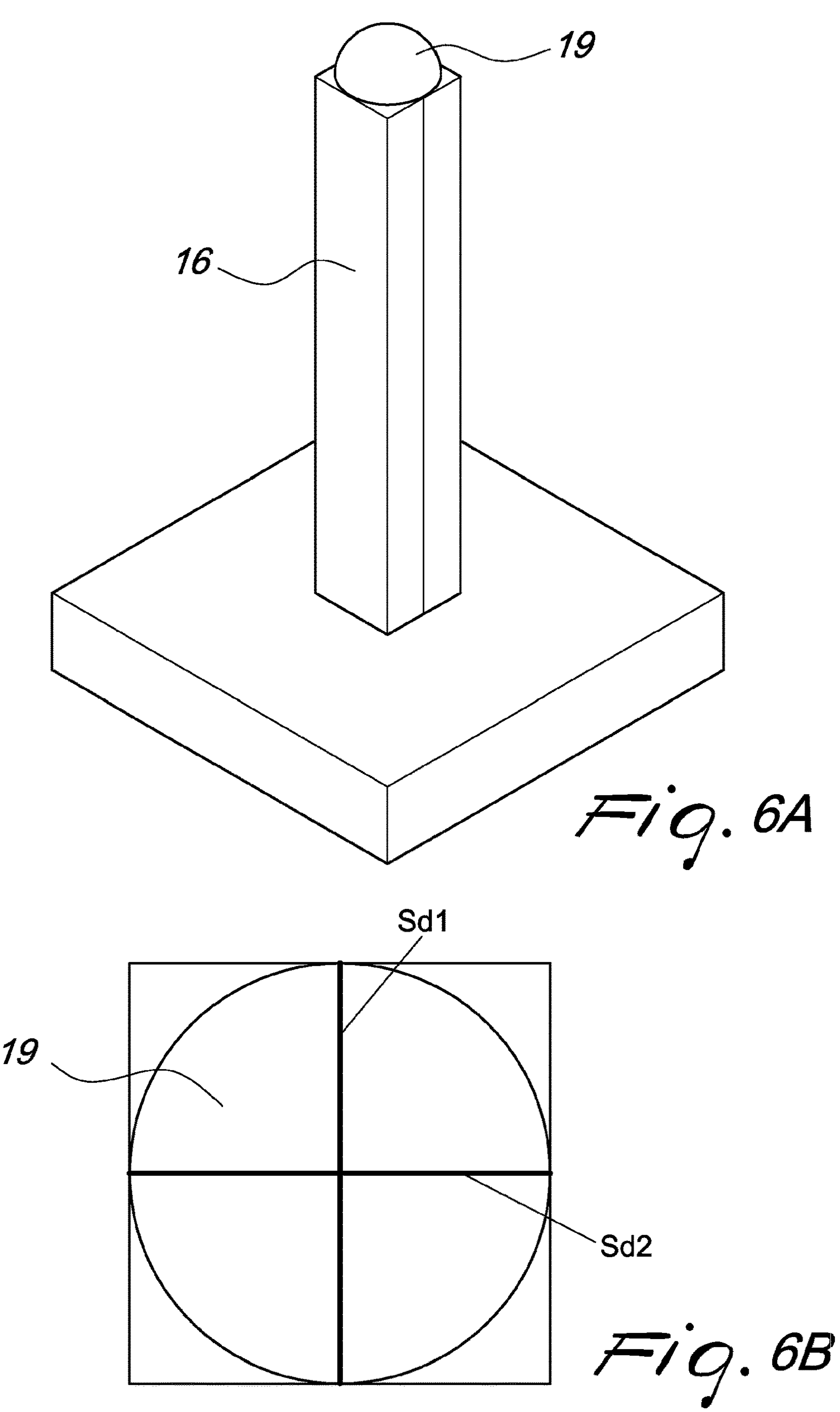
Figure 6C:
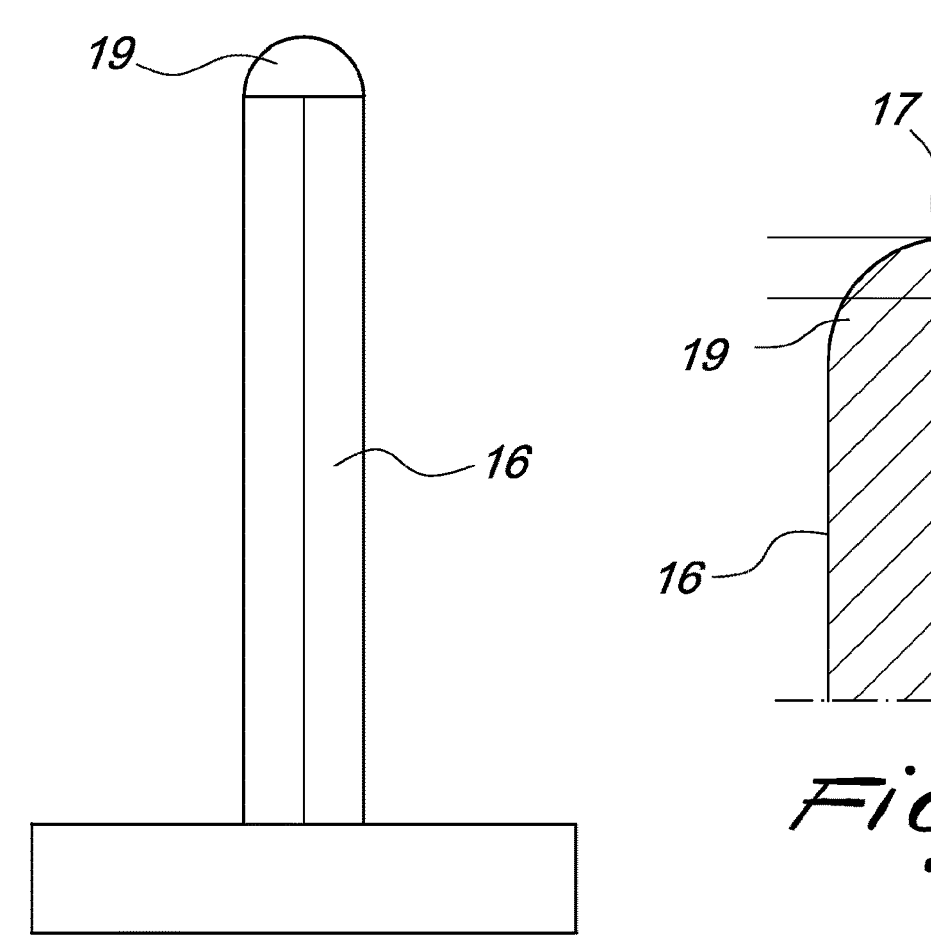
Figure 6D:
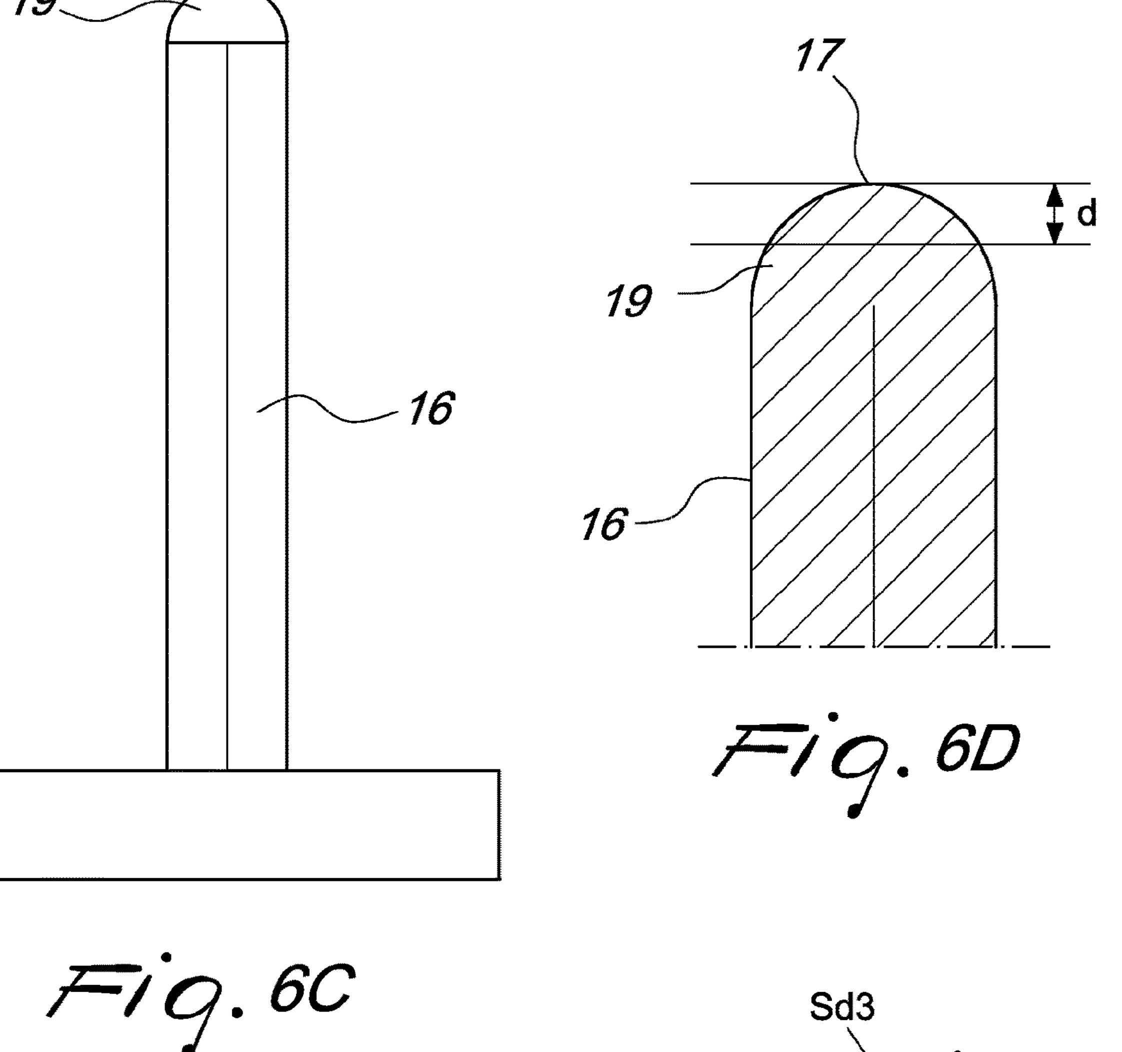
Figure 6E:
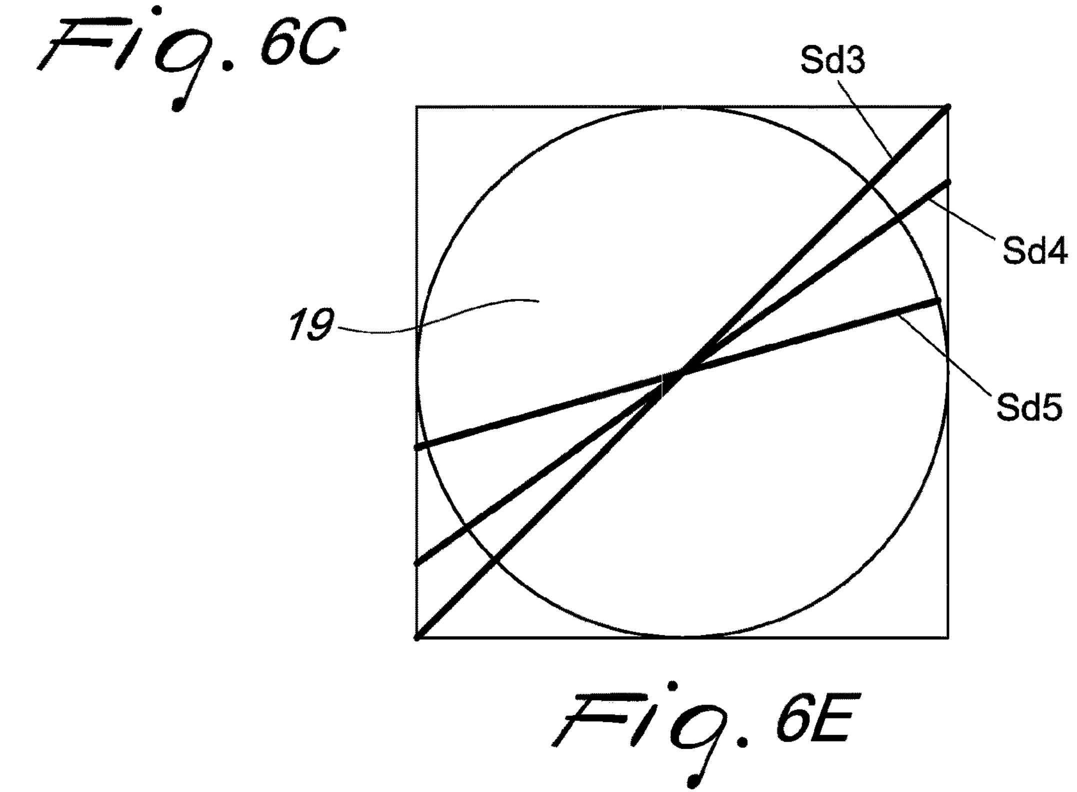
Figures 6F, 6G, 7A:
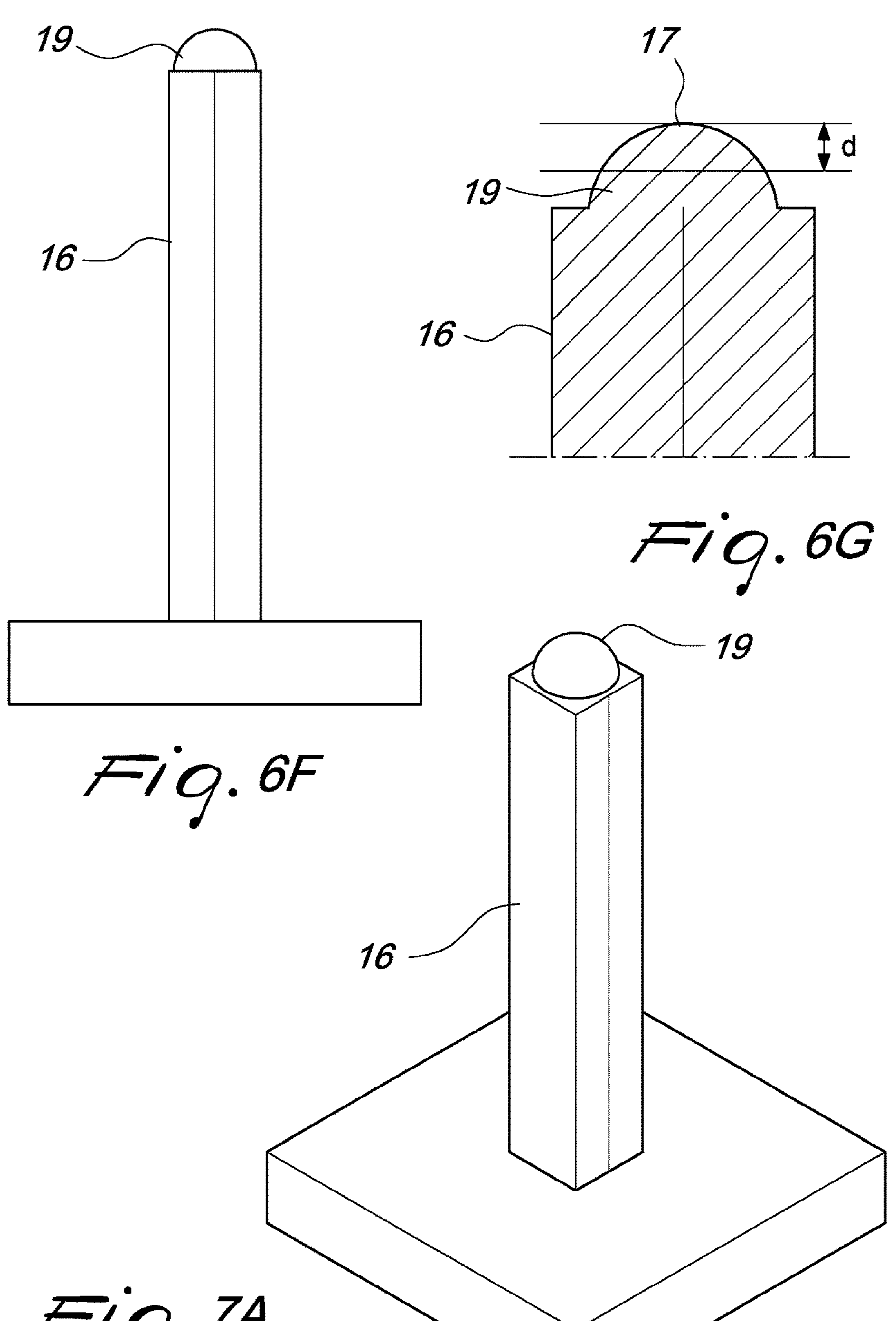
Figures 7B, 7C, 8A:
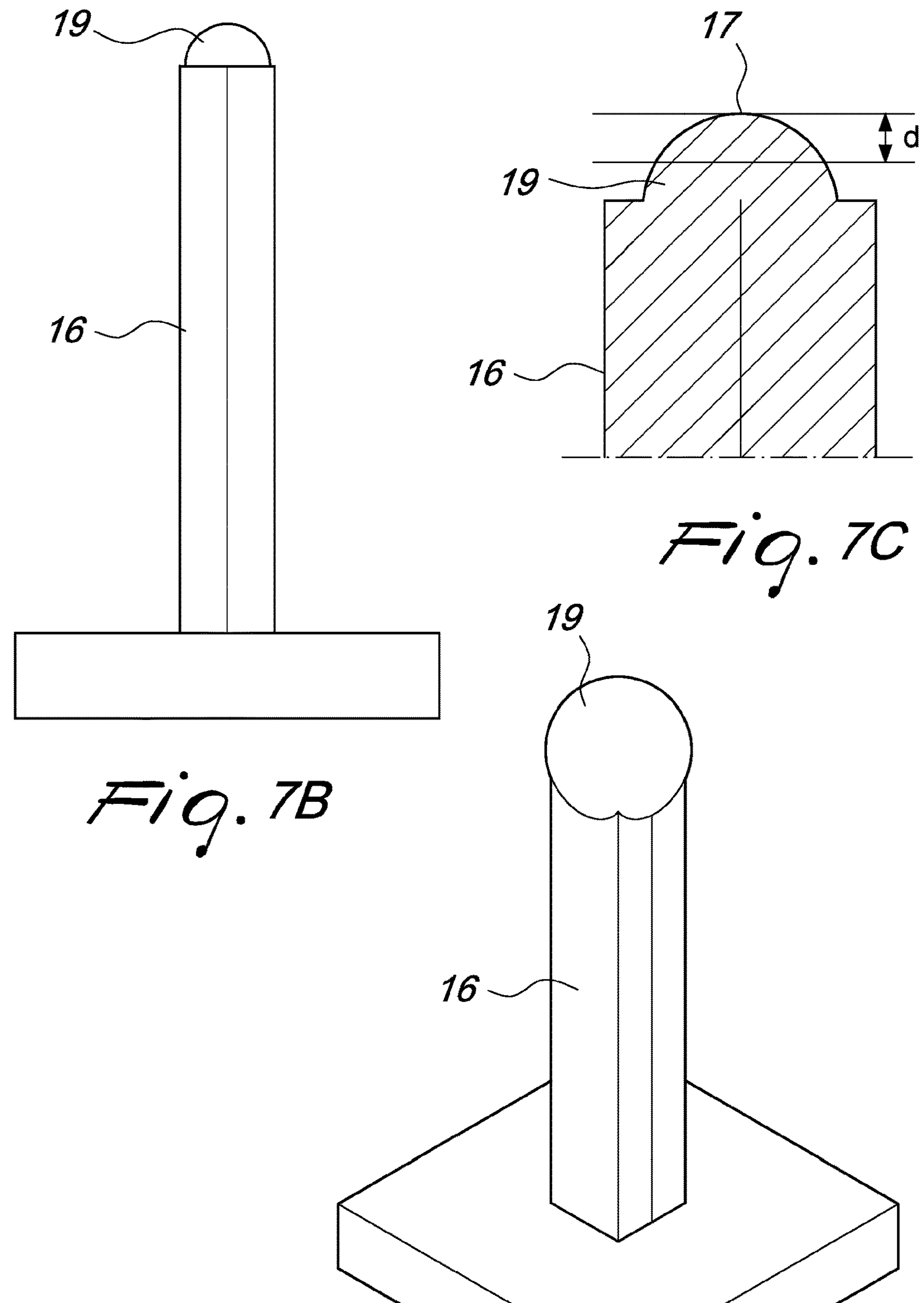
Figures 8B, 8C, 8D:
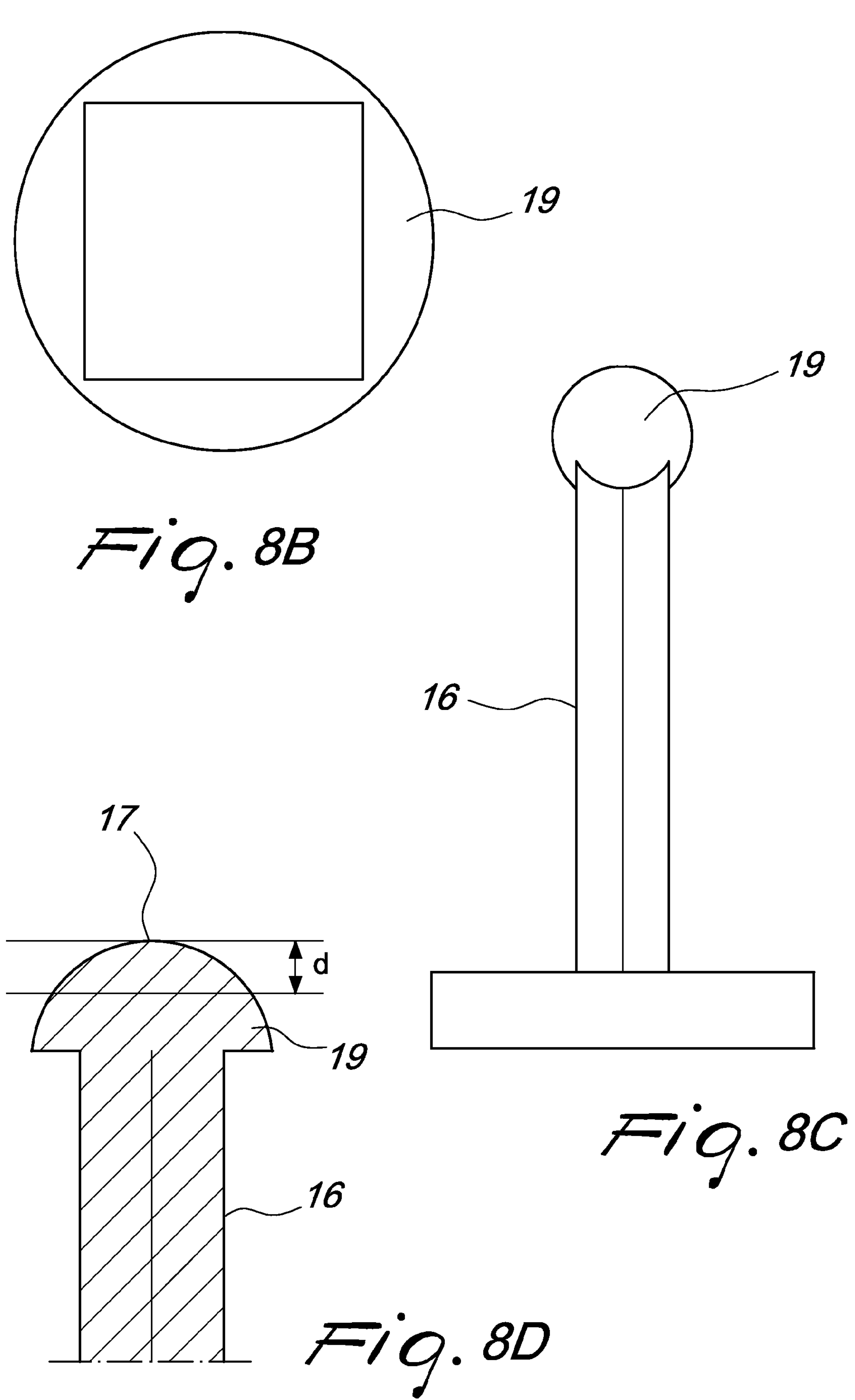
Figure 9A:
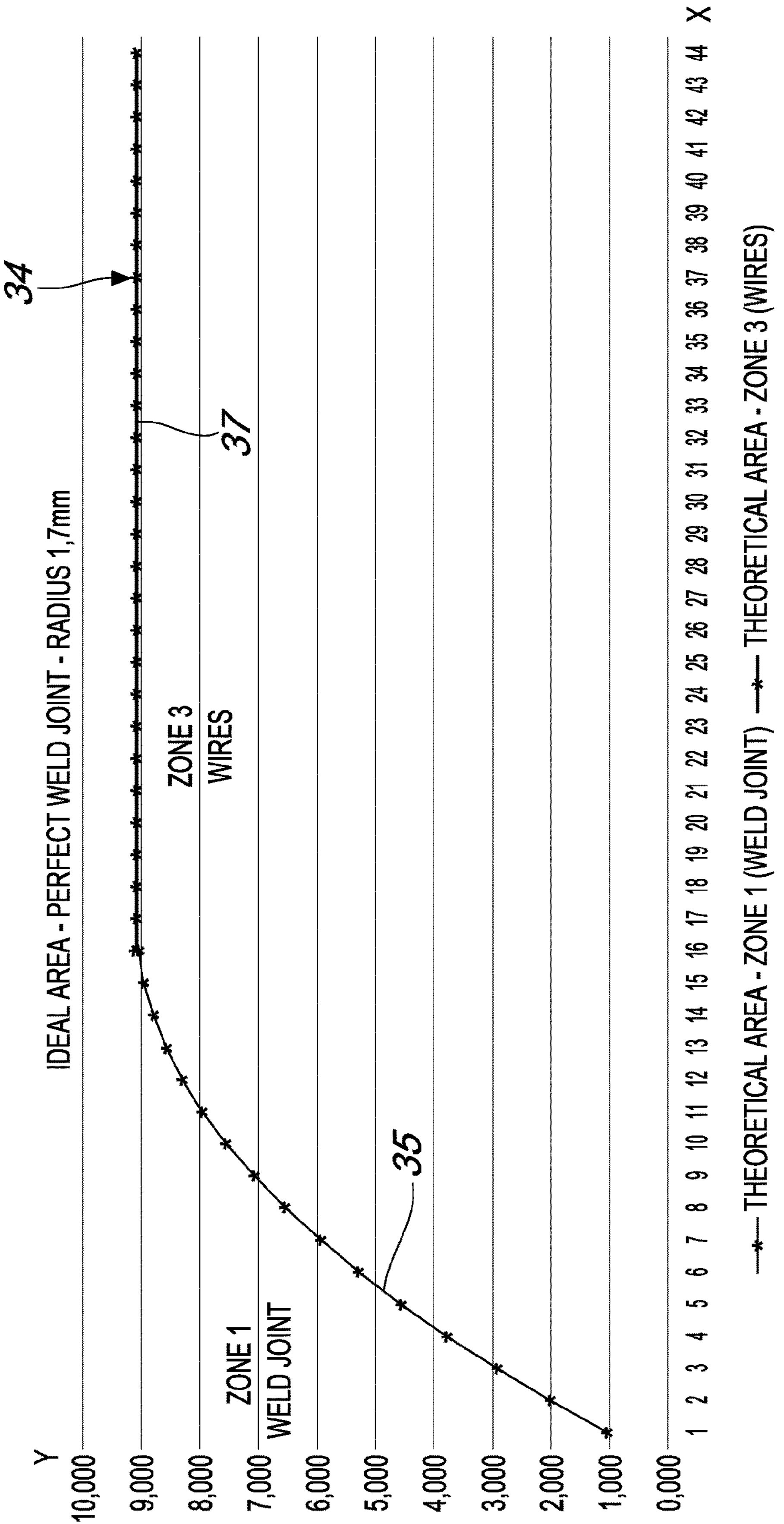
Figure 9B:
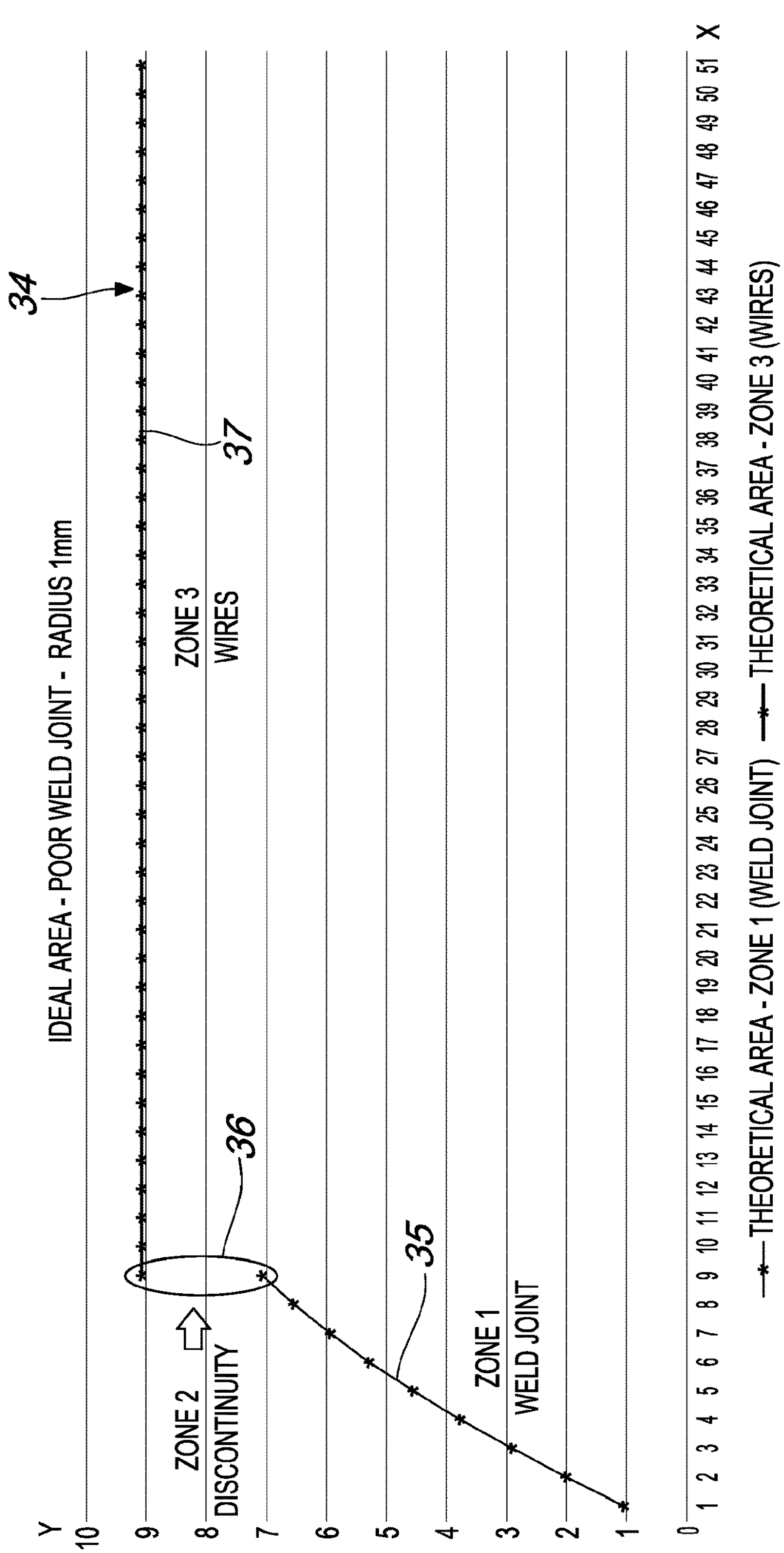
Figure 9C:
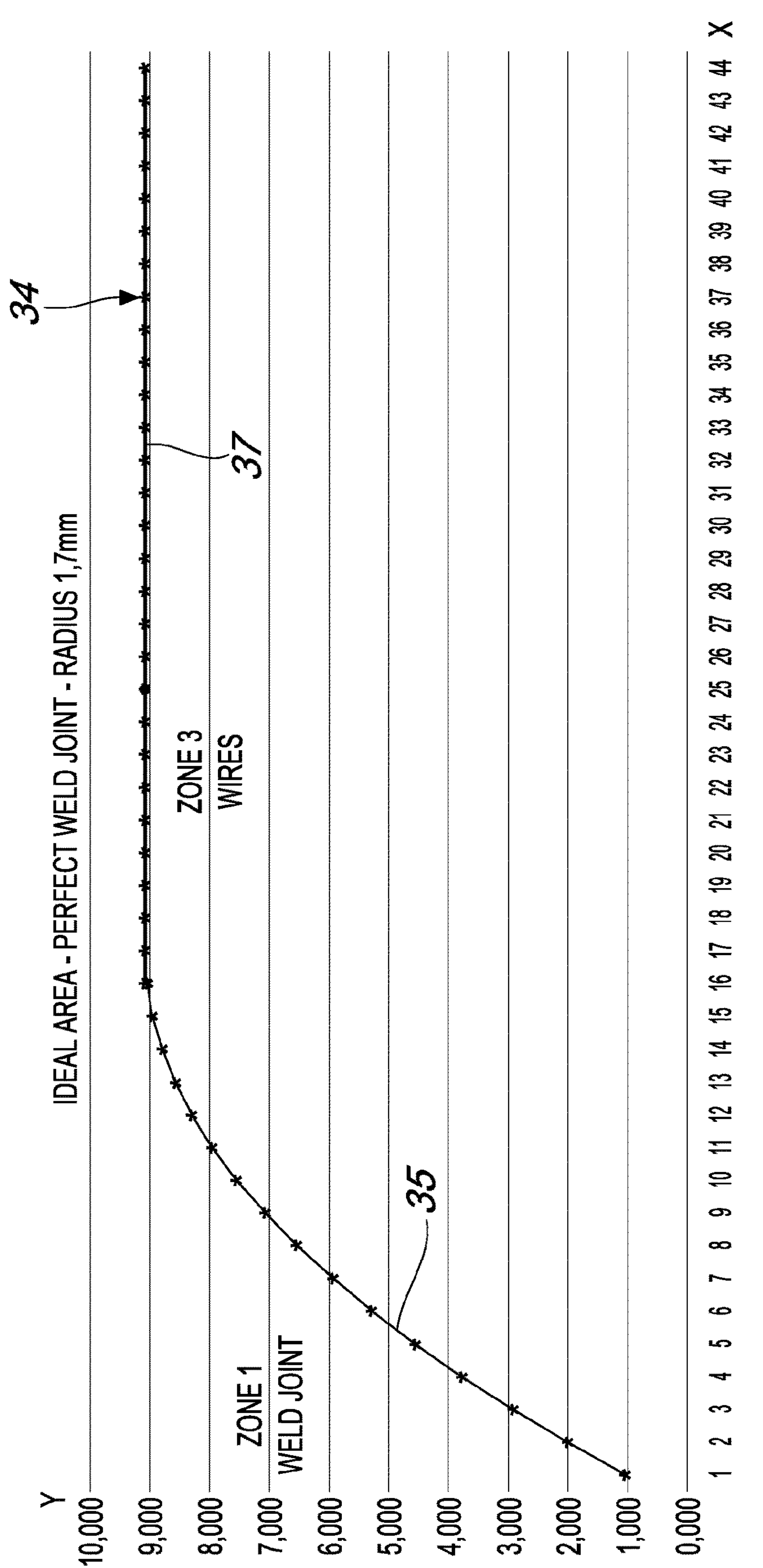
Figure 10A:
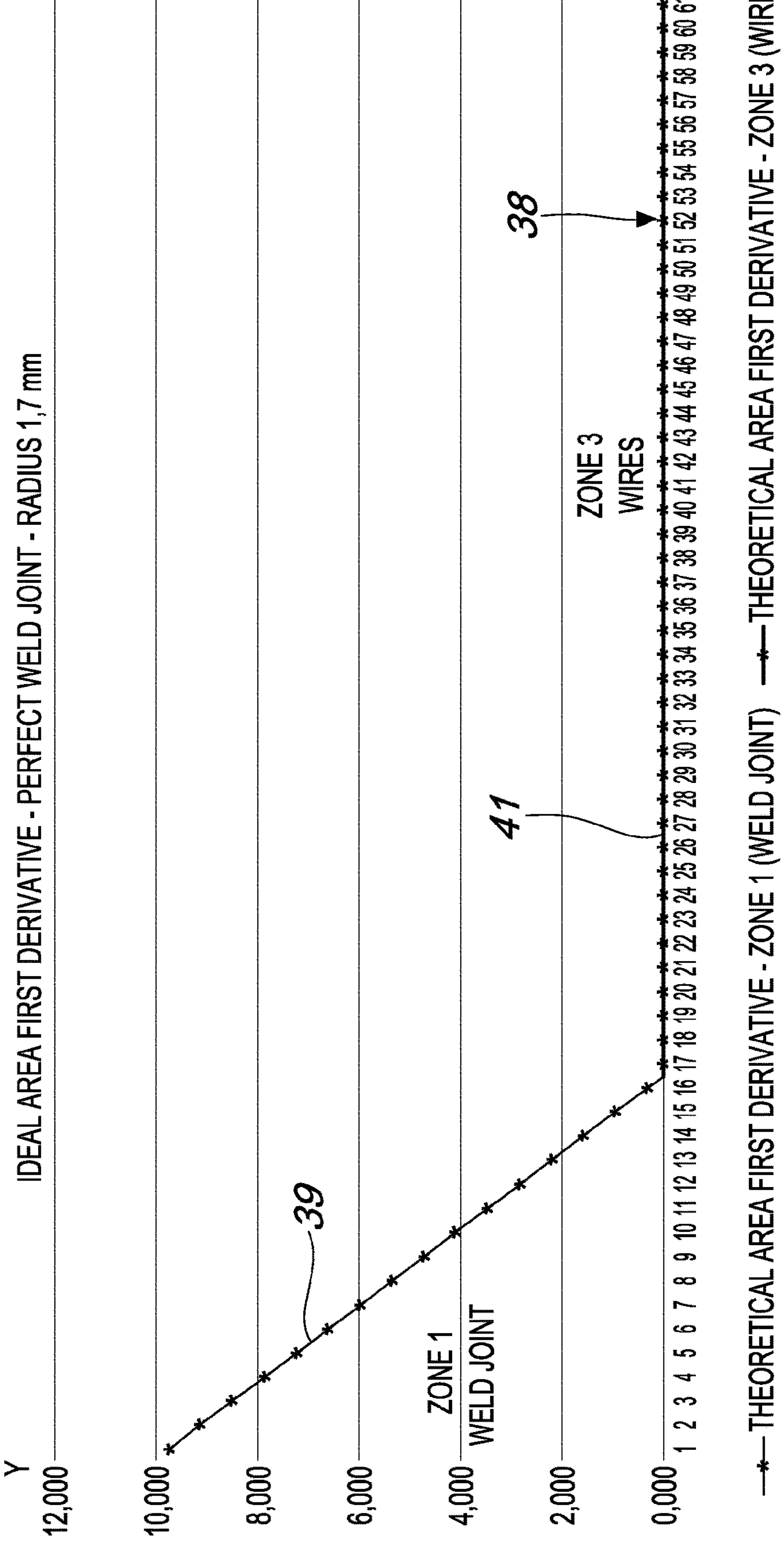
Figure 10B:
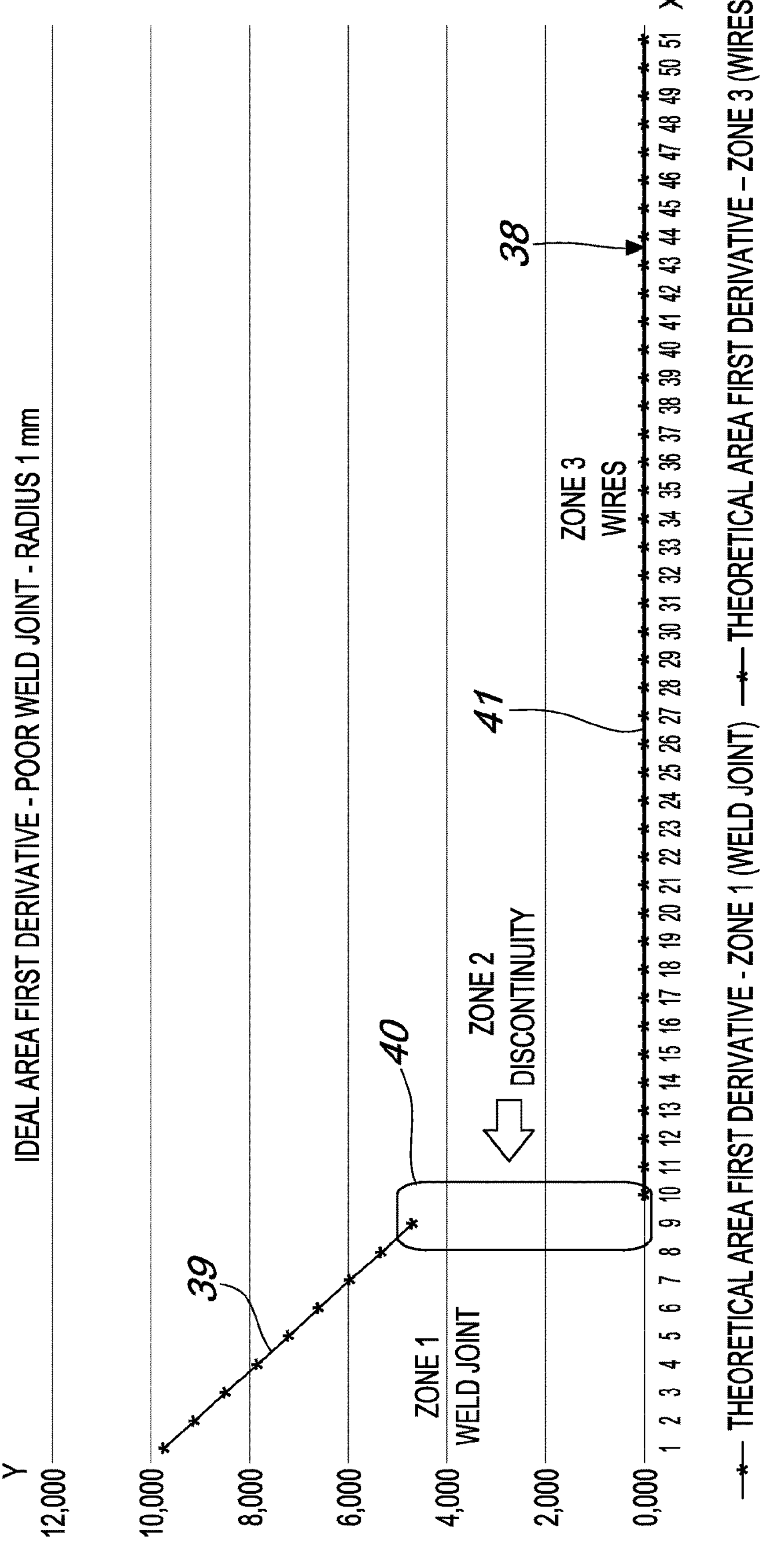
Figure 11A:
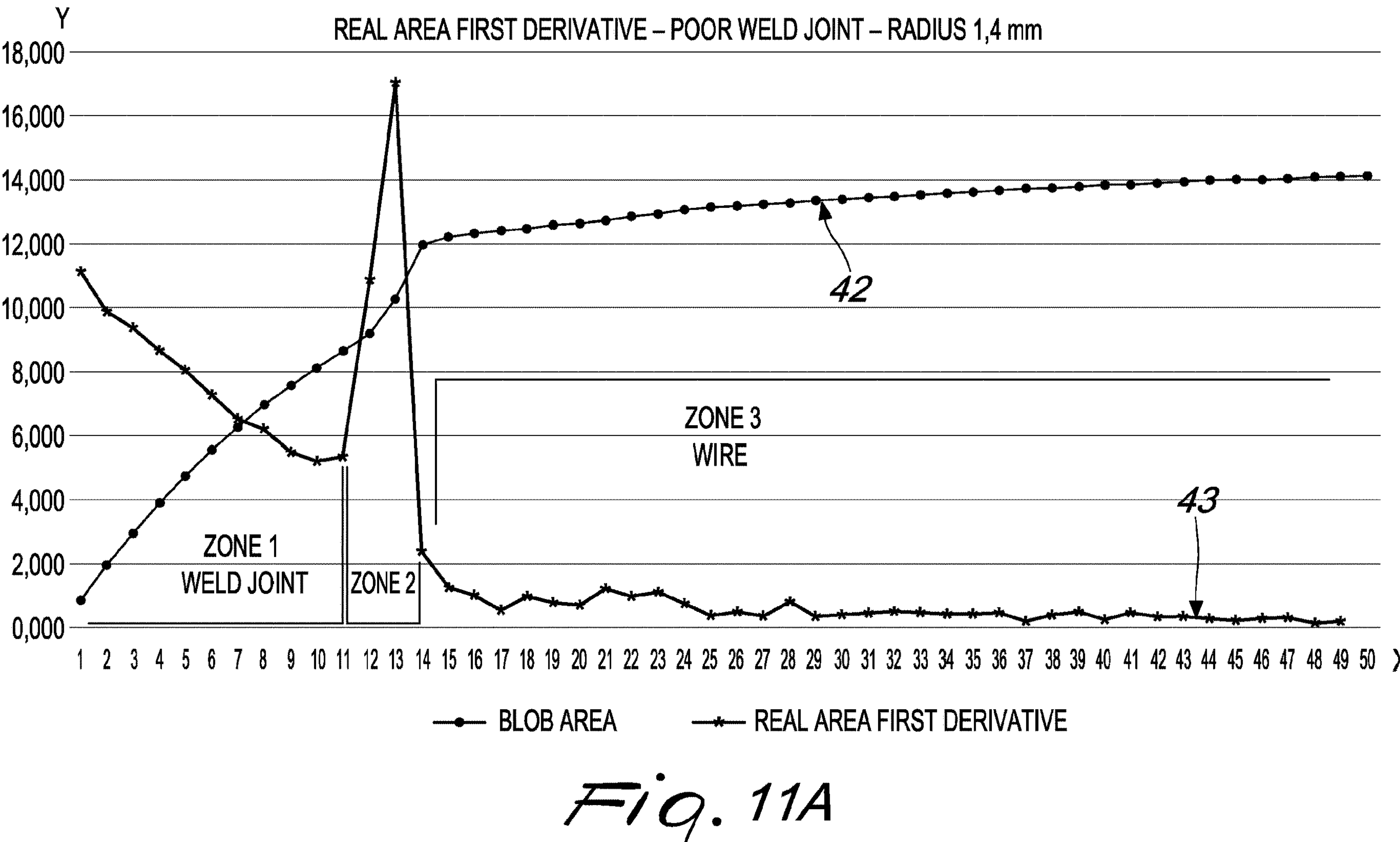
Figure 11B:
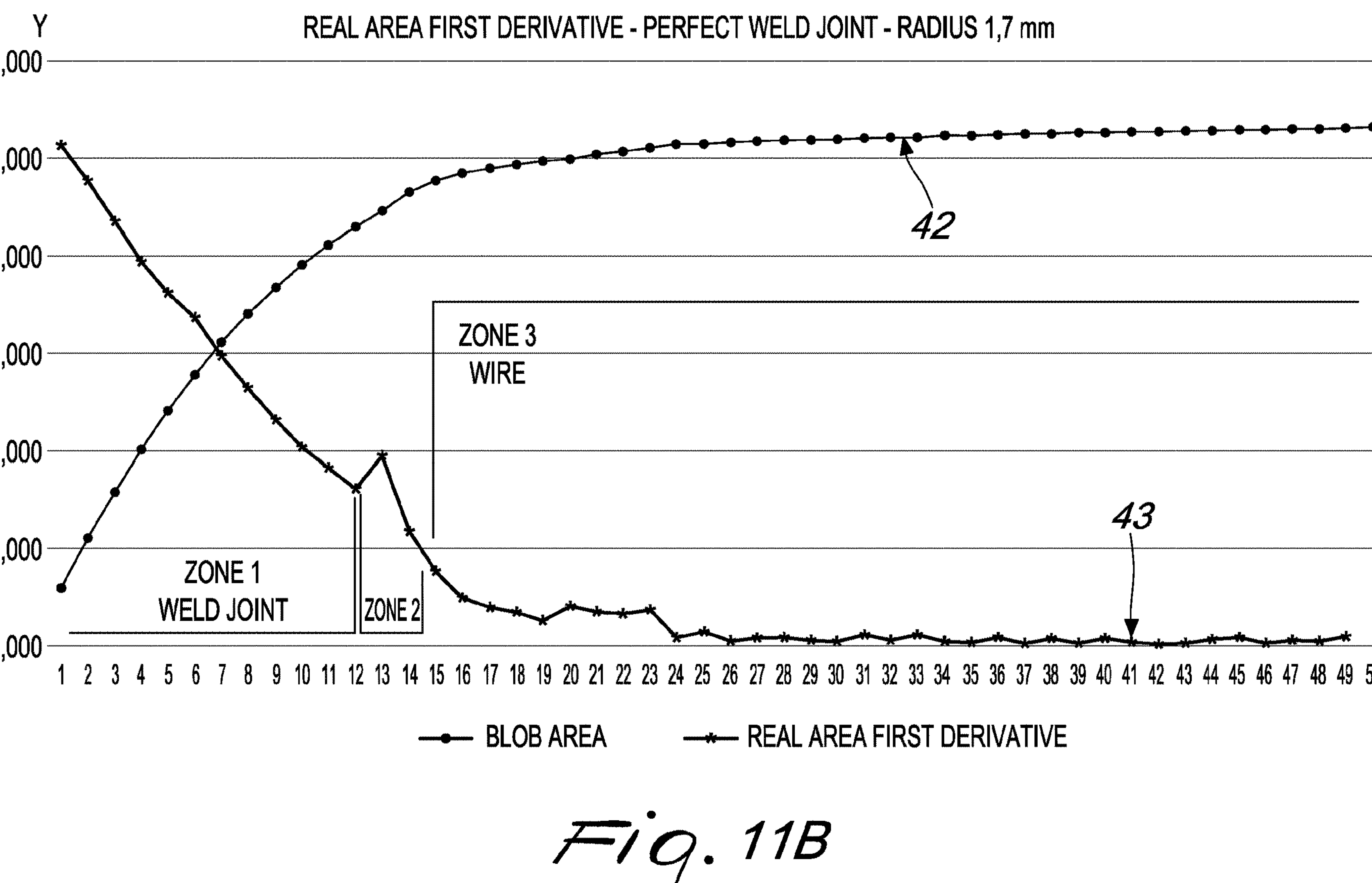
Figure 12:
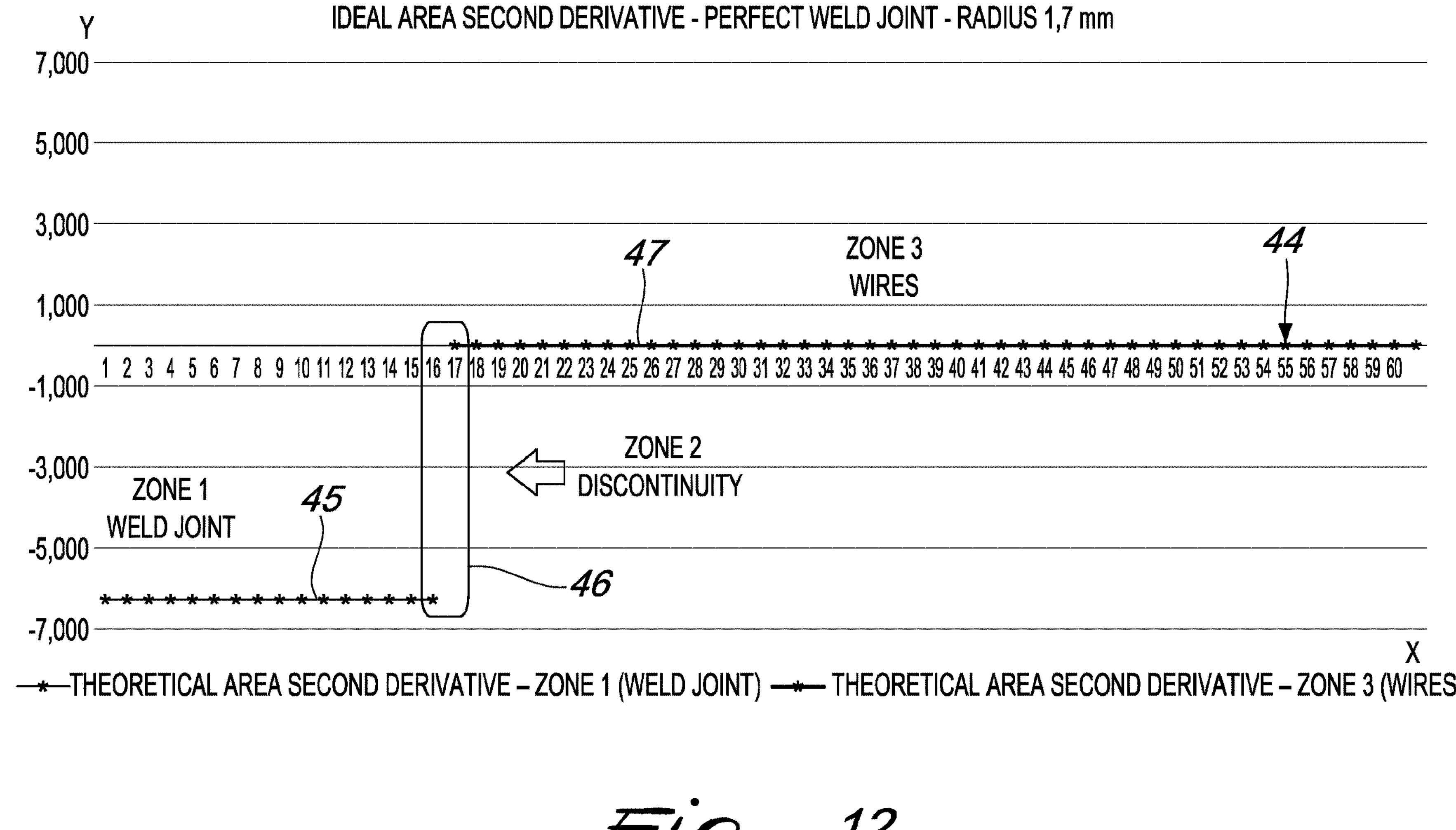
Figure 13A:
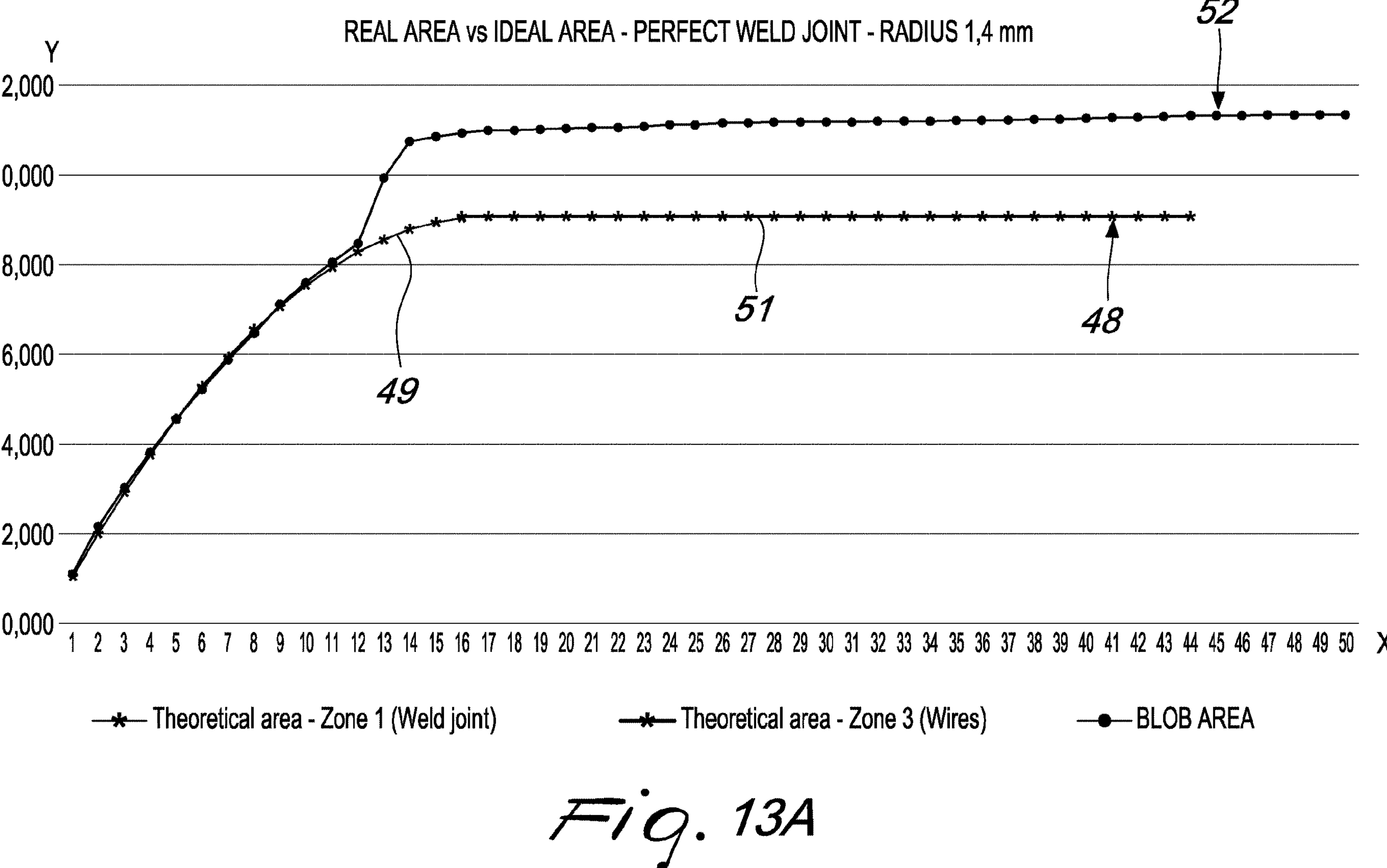
Figure 13B:
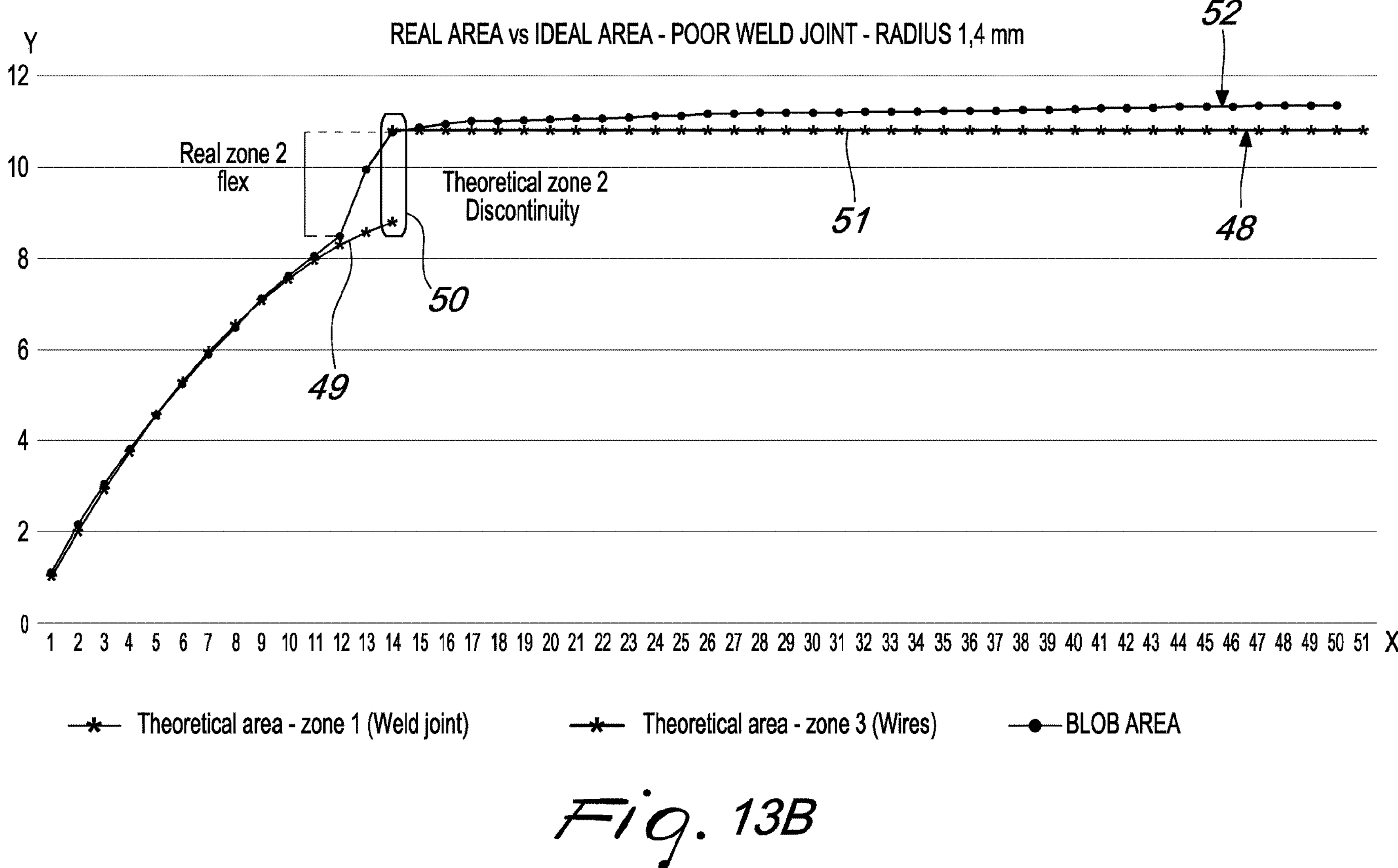
Figure 14:
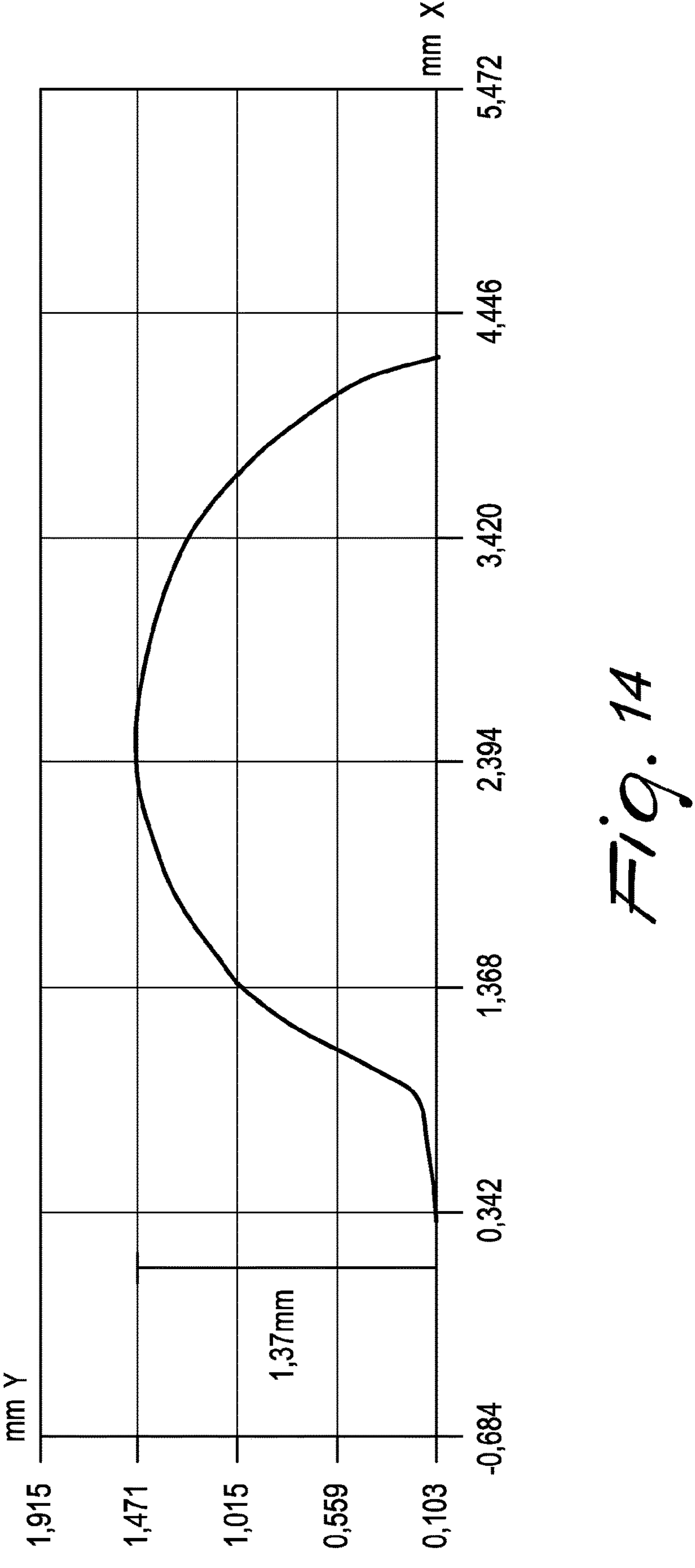
Figure 15A:
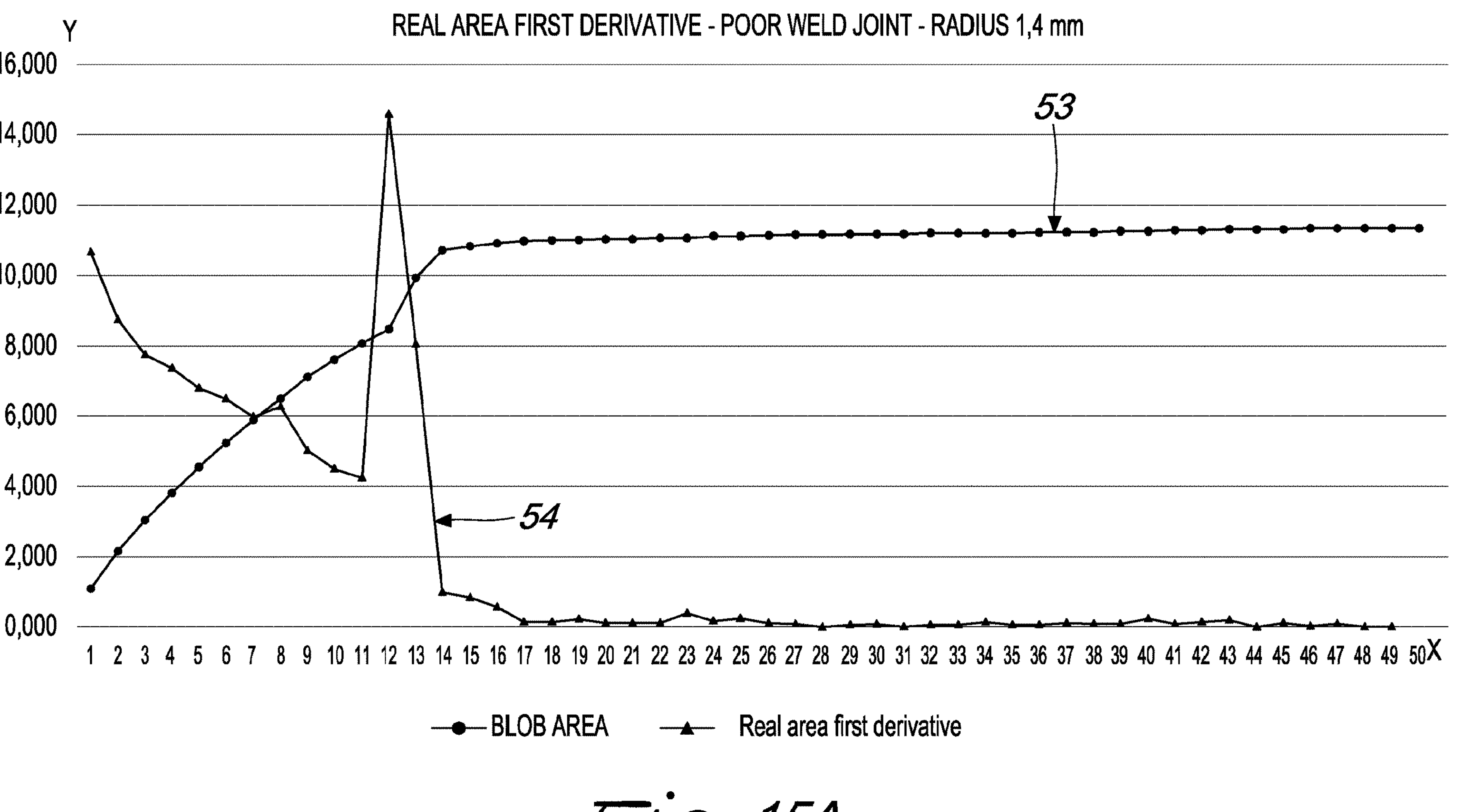
Figure 15B:
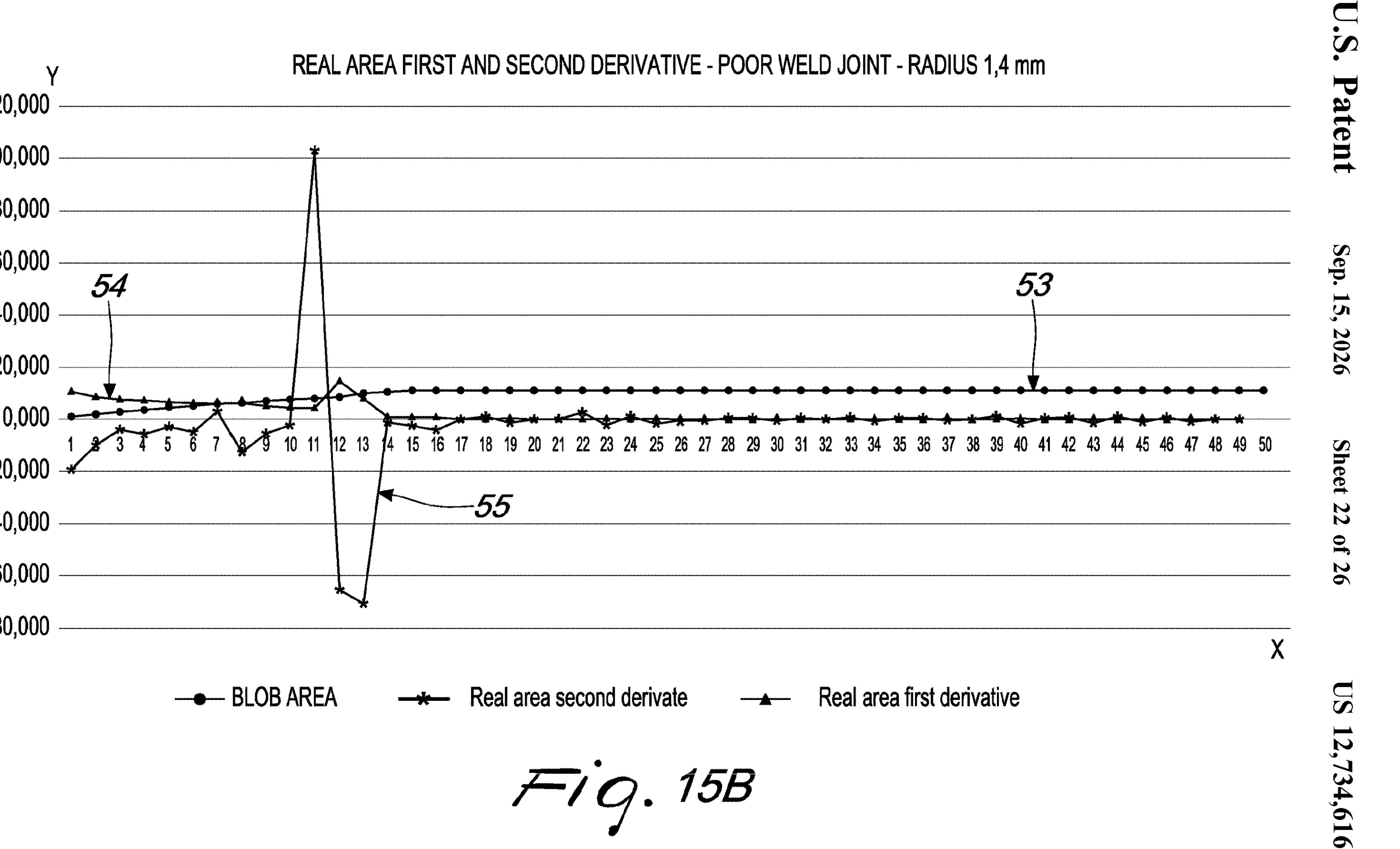
Figure 16A:
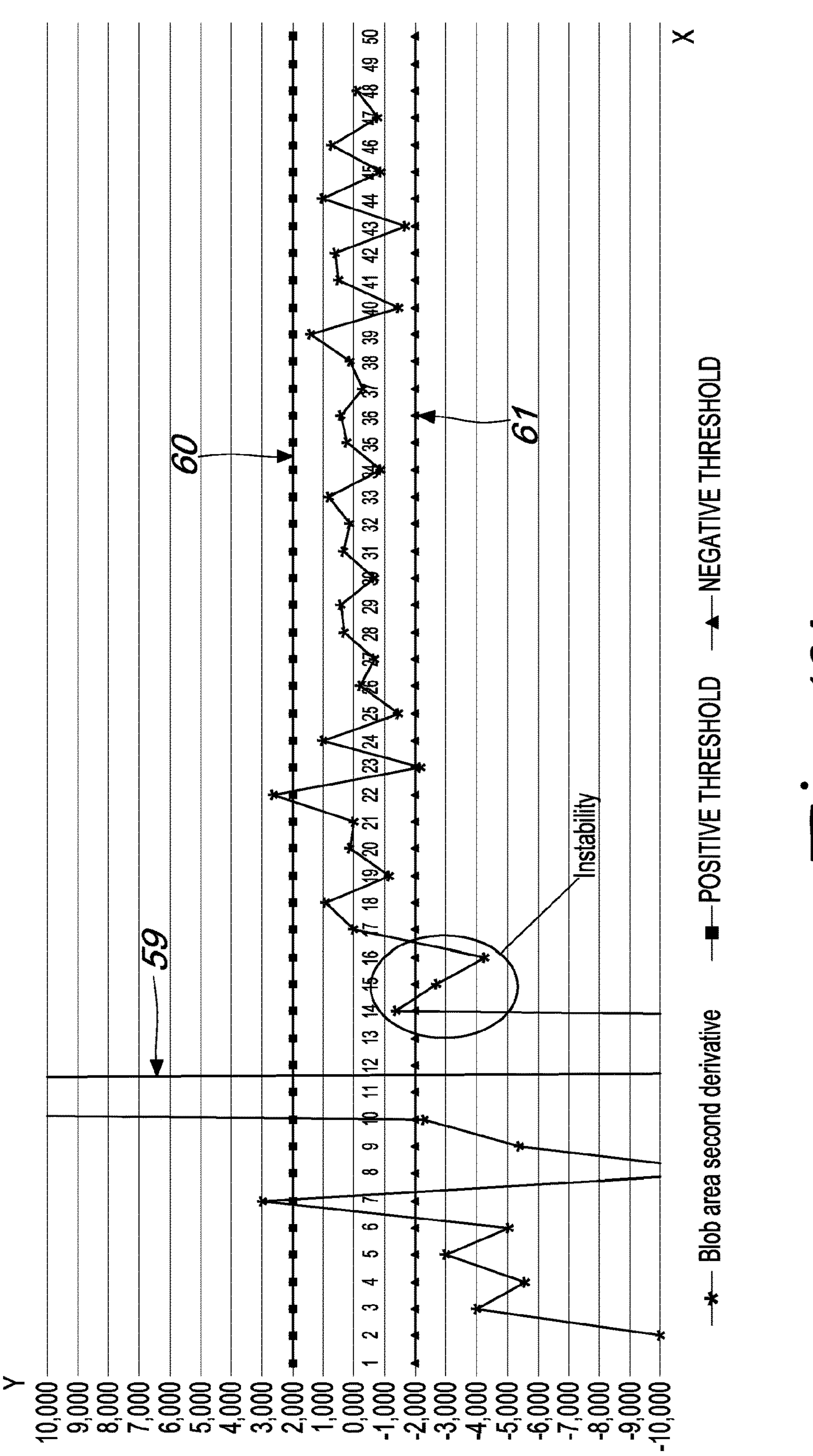
Figure 16B:
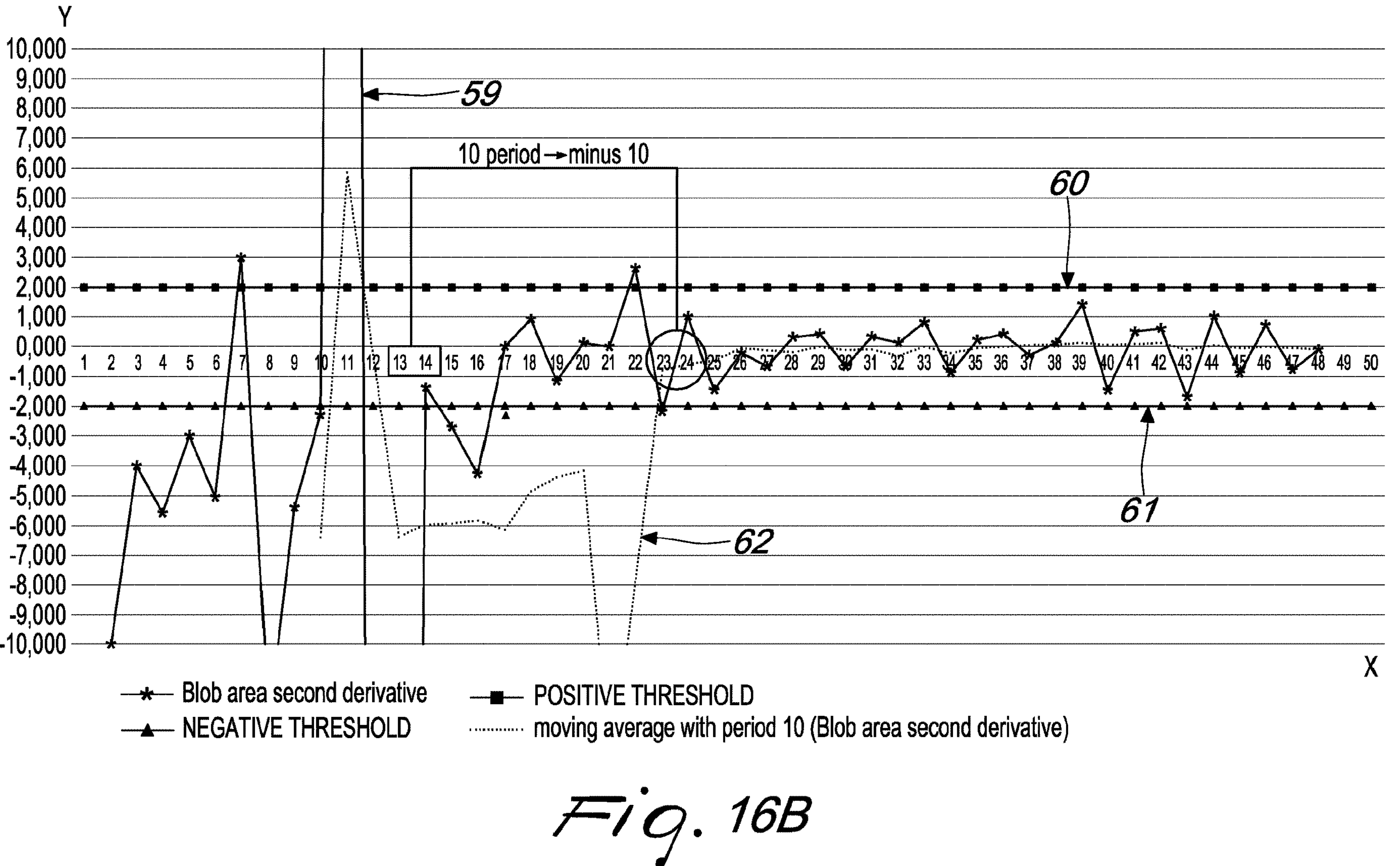
Figure 17:
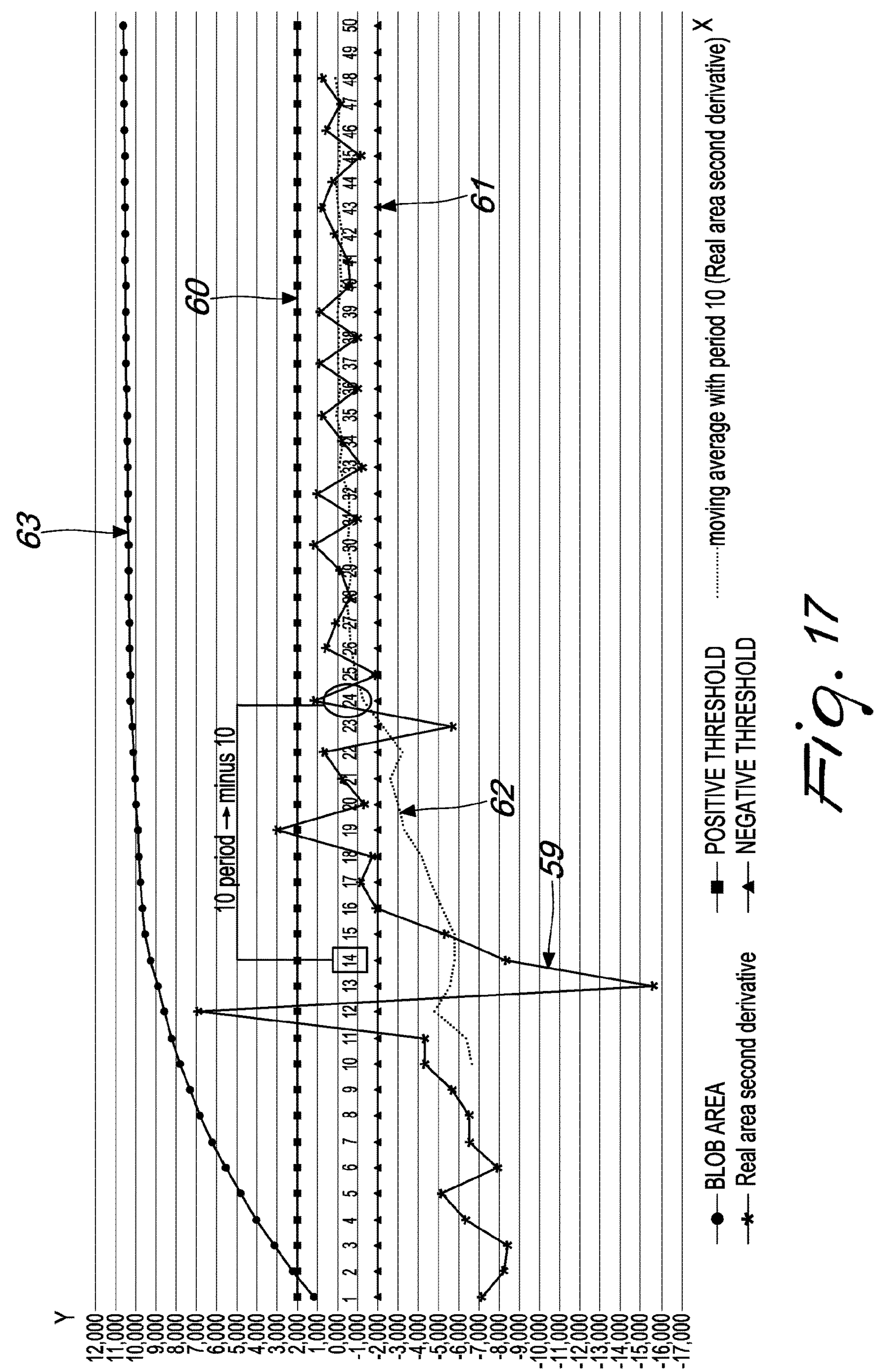

FIGS. 6A to 6G show respectively a three-dimensional (3D) inscribed welding joint, a first group of segments of diametric cross-section on a schematic plan view of the inscribed welding joint and an example of the corresponding resultant diametric cross-sections (both full and detailed view), and a second group of segments of diametric cross-section on a schematic plan view of the inscribed welding joint and an example of the corresponding resultant diametric cross-sections (both full and detailed view);

FIGS. 7A to 7C show respectively a three-dimensional (3D) poor welding joint, and an example of the diametric cross-sections of the scant welding joint (both full and detailed view);

FIGS. 8A to 8D show respectively a three-dimensional (3D) excess welding joint, a schematic plan view of the excess welding joint, and an example of the diametric cross-sections of the excess welding joint (both full and detailed view);

FIGS. 9A, 9B and 9C are graphs showing the trend of the area of the transverse cross-sections of a theoretical or ideal welding joint, respectively for inscribed, poor and excess welding joints;

FIGS. 10A and 10B are graphs showing the trend of the first derivative of the function of the area of the transverse cross-sections of a theoretical or ideal welding joint, respectively for inscribed (or excess) and poor welding joints;

FIGS. 11A and 11B are graphs showing the trend of the first derivative of the function of the 2D grayscale blob area of the transverse cross-sections of a real welding joint, respectively for poor and inscribed (or excess) welding joints;

FIG. 12 is a graph showing the trend of the second derivative of the function of the area of the transverse cross-sections of a theoretical or ideal welding joint, for inscribed (or excess) welding joints;

FIGS. 13A and 13B are graphs showing a comparison between the trend of the transverse cross-sections of a theoretical or ideal welding joint, respectively for inscribed (or excess) and poor welding joints, and the trend of the 2D grayscale blob area of the transverse cross-sections of a real welding joint;

FIG. 14 is a graph showing a profile of the 3D reconstruction of the real welding joint of FIGS. 13A and 13B;

FIGS. 15A, 15B and 15C are graphs showing the trend of the first derivative and of the second derivative of the function of the 2D grayscale blob area of the transverse cross-sections of a real welding joint, for a poor welding joint;

FIGS. 16A and 16B are graphs showing in detail the trend of the second derivative of the function of the 2D grayscale blob area of the transverse cross-sections of a real welding joint, for a poor welding joint, of FIGS. 15A, 15B and 15C;

FIG. 17 is a graph showing in detail the trend of the second derivative of the function of the 2D grayscale blob area of the transverse cross-sections of a real welding joint, for inscribed (or excess) welding joints.

With regard to FIGS. 9A, 9B and 9C, 10A and 10B, 11A and 11B, 12, 13A and 13B, 15A, 15B and 15C, 16A and 16B, and 17, it should be noted that the axis of the abscissa (X) represents the number of the transverse cross-section of the welding joint 19, with one transverse cross-section for each one of the distances d from the peak 17 of the welding joint 19, where as the number rises the distance d increases and we move farther from the peak 17 of the welding joint 19, while the axis of the ordinate (Y) represents the 2D grayscale blob area, expressed in $mm^2$, of the corresponding transverse cross-section of the welding joint 19.

Preliminarily, it should be noted that the method according to the present invention is executed by a data processing device or system 10, in short a computer 10, provided with suitable calculation capacity and memory.

Figure 1:
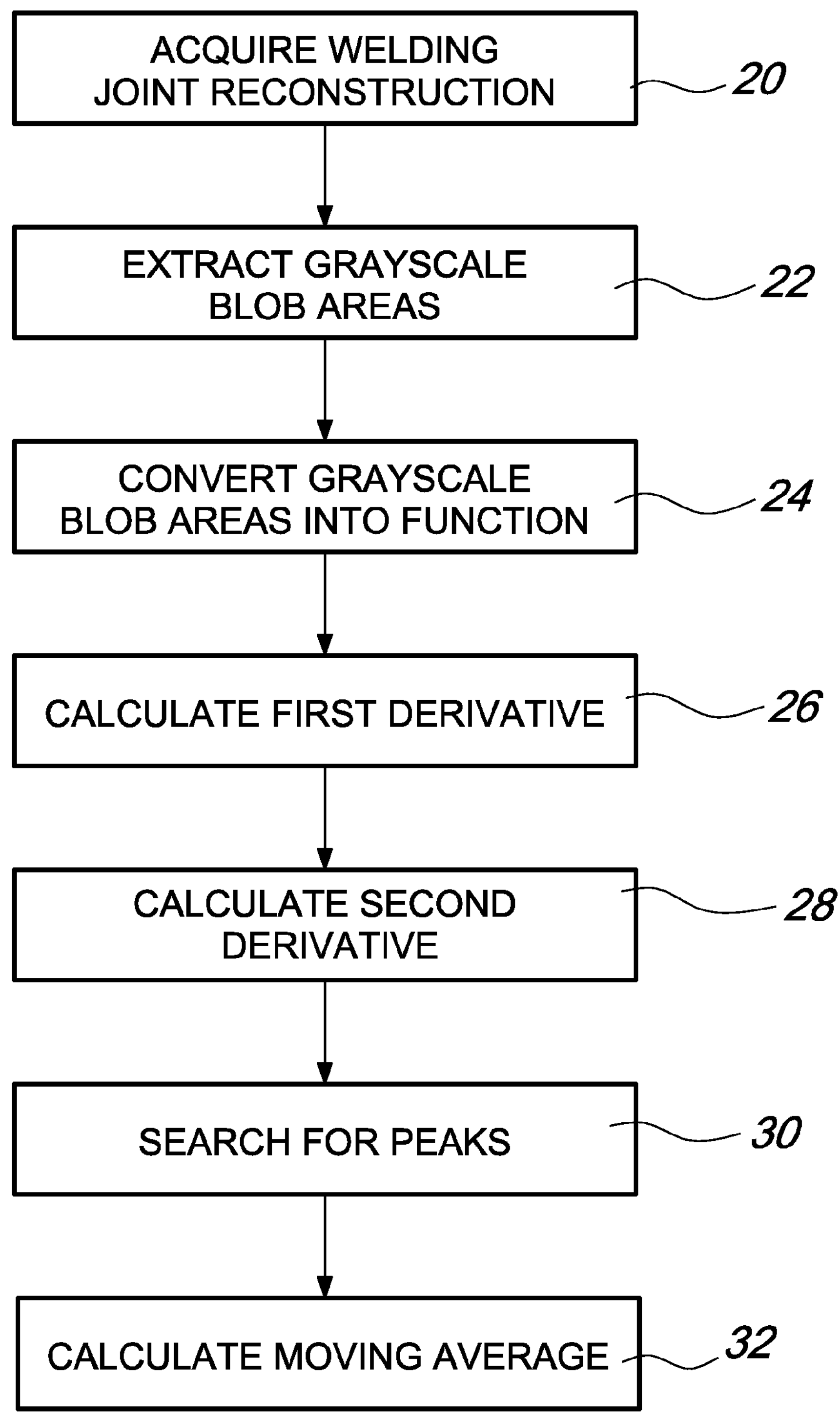
FIG. 1 is a schematic flowchart of an embodiment of the method for quality control of a welding joint between a pair of ends of conducting elements of an inductive winding of a stator according to the present invention.
Figure 2:
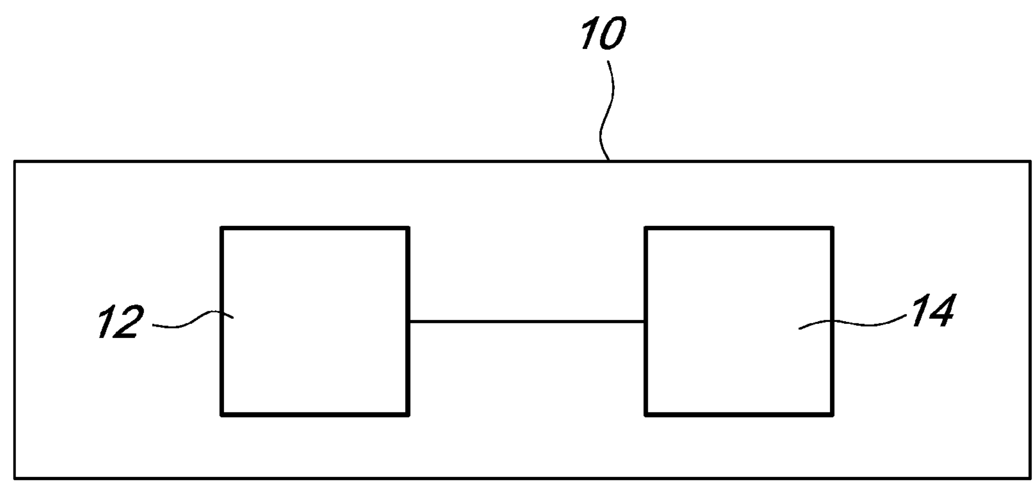
FIG. 2 is a schematic block diagram of an embodiment of the computer for executing the method for quality control of a welding joint between a pair of ends of conducting elements of an inductive winding of a stator according to the present invention.
Figure 2:
Figure 3:
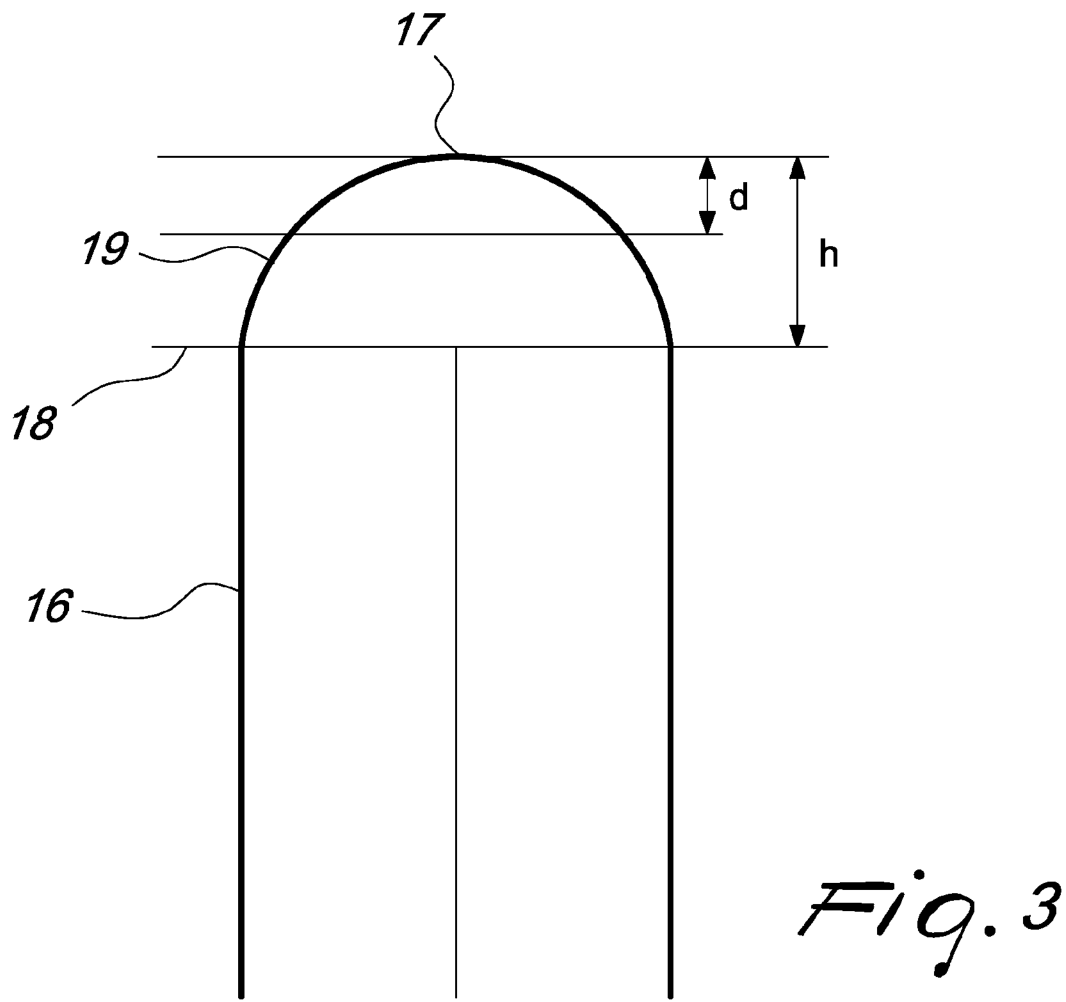
FIG. 3 is a schematic elevation view of a welding joint between a pair of ends of conducting elements of an inductive winding of a stator.

With particular reference to FIG. 1, the method for quality control of a welding joint 19 between a pair of ends (or terminals) of conducting elements 16 of an inductive winding of a stator according to the present invention comprises substantially the following steps.

Initially, in step 20, a three-dimensional (3D) reconstruction 76 of the welding joint 19 is acquired for examination and evaluation, this 3D reconstruction 76 being in the form of a depth map.

Preferably, the acquisition of the 3D reconstruction 76 of the welding joint 19 is executed with the pair of ends of conducting elements 16 of said welding joint 19 oriented vertically and with the base of the ends pointing upward. Preferably, the welding joint 19 between the pair of ends of conducting elements 16 and the 3D reconstruction 76 of said welding joint 19 have the same orientation as a common geometric reference system.

The 3D reconstruction 76 of the welding joint 19 can be generated and originate from a 3D vision device or system. The 3D vision device or system can be functionally connected to the computer 10 that executes the method according to the invention; in this case the computer 10 is also provided with suitable capacities for interfacing with the 3D vision device or system, and vice versa. Advantageously, the 3D vision device or system can use the Fringe Pattern Projection technique, which is briefly described as follows: a set of light patterns is projected onto a worktop (in this case where the stator with the inductive winding is arranged) and a 3D sensor reconstructs a 3D object (in this case the welding joints 19 of conducting elements of hairpins 16 of the inductive winding) following the analysis of the reflections of said light patterns.

Figure 4:
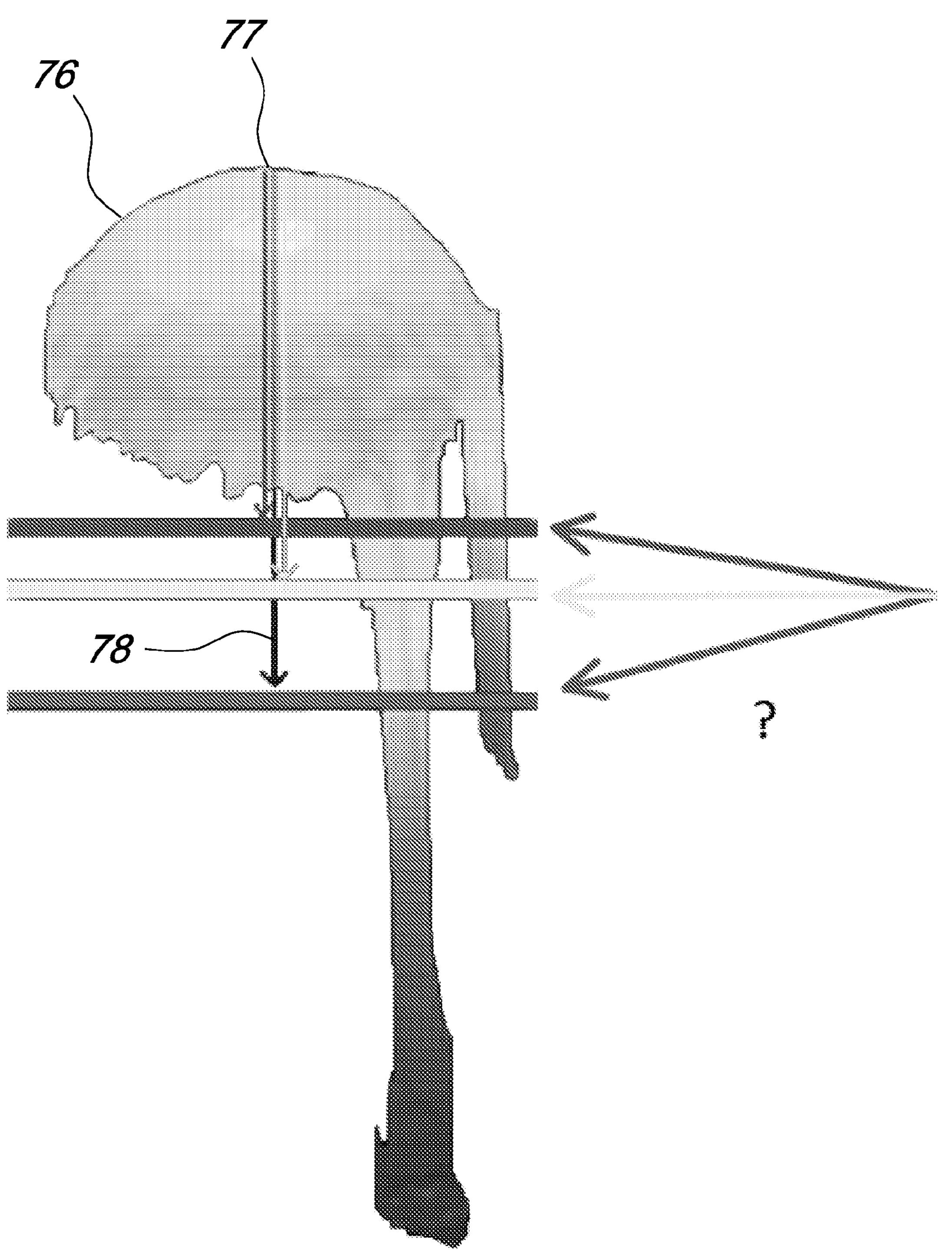
FIG. 4 is a front elevation view of an example of 3D reconstruction of a welding joint between a pair of ends of conducting elements.

Note that, upon analyzing the profiles of the 3D reconstruction 76 of the welding joint 19 of the previous step 20, these profiles being extracted or obtained by longitudinally sectioning the same 3D reconstruction 76 by as many perpendicular planes as there are profiles, it is a very complex matter to identify the base 18 of the welding joint 19, i.e. the plane from which the welding joint 19 rises, and consequently estimate the elevation or height h between the peak 17 and the base 18 of said welding joint 19. In fact, as can be observed for example in FIG. 4, it is frequent the case that the 3D reconstruction 76 of the welding joint 19 is incomplete below a certain elevation. This incompleteness of the 3D reconstruction 76 is inevitable owing to the positioning and shape structure of the welding joints 19 of the inductive winding in the stator.

Figure 5:
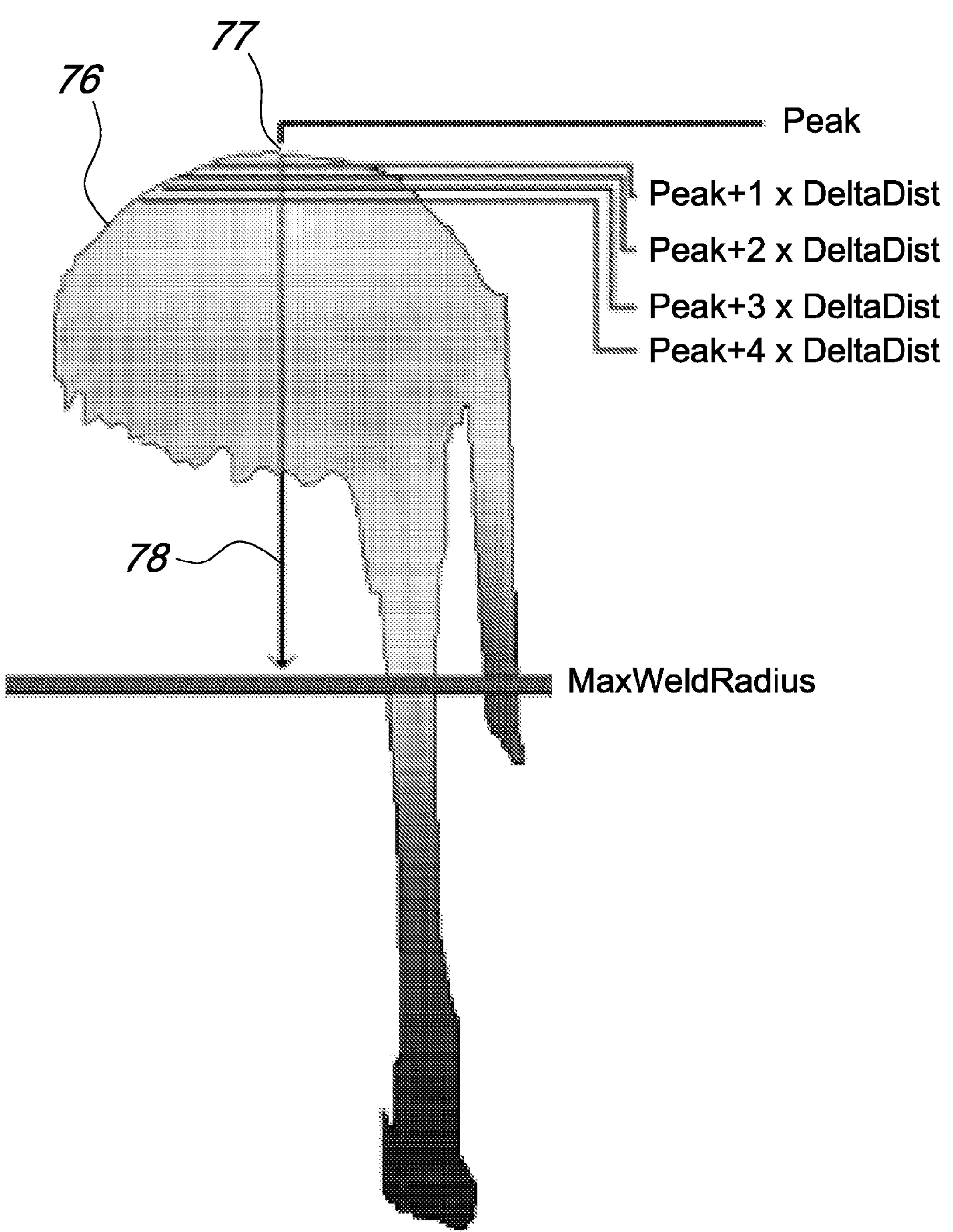
FIG. 5 is the front elevation view of the 3D reconstruction of a welding joint shown in FIG. 5, which schematically illustrates an example of a plurality of transverse cross-sections starting from the peak.

In step 22, a plurality of two-dimensional (2D) grayscale blob areas are extracted or obtained from the 3D reconstruction 76 of the welding joint 19 in the previous step 20. In general, in artificial vision, also known as computer vision, a blob is a group of pixels of an image that relate to each other in that they share one or more common properties. With particular reference to FIG. 5, the 3D reconstruction 76 of the welding joint 19 is sectioned transversely by a plurality of cutting planes arranged at a progressive distance 78 from the peak (highest point) 77 of said 3D reconstruction 76 of the welding joint 19. In practice, first the peak 77 of the 3D reconstruction 76 of the welding joint 19 is identified, and then said 3D reconstruction 76 is transversely sectioned at an elevation 78 equal to that of the peak 77 plus a constant distance DeltaDistFromPeak (abbreviated to DeltaDist), and then the transverse sectioning operation is repeated again, descending by a further constant distance DeltaDistFromPeak, and so on. Advantageously, the transverse e sectioning operations of the 3D reconstruction 76 of the welding joint 19 continue until the cutting or sectioning level 78 reaches, starting from the elevation of the peak 77, an absolute value that is greater than or equal to a maximum distance MaxWeldRadius, the maximum possible radius of a welding joint 19. In particular, this distance MaxWeldRadius is comprised between 1 mm and 6 mm, and preferably comprised between 2 mm and 3 mm. The constant distance DeltaDistFromPeak and the maximum distance MaxWeldRadius can be chosen by a human operator, therefore they can be parametrized.

The planes resulting from the transverse sectioning operations of the 3D reconstruction 76 of the welding joint 19 are called cutting planes because they "cut" said 3D reconstruction 76 of the welding joint 19 into two portions, one upper portion (above the cutting plane) and one lower portion (below the cutting plane). The grayscale image of each cutting plane comprises a two-dimensional representation of everything that is above the cutting plane in white, and of everything that is below the cutting plane in black (the background on the other hand is represented in gray). The 2D grayscale blob area, of interest in the scope of the invention, for example expressed in $mm^2$, is the white area of the grayscale image of the cutting plane. Advantageously, at the end of step 22 we therefore have a number of 2D grayscale blob areas equal to MaxWeldRadius/DeltaDistFromPeak, rounded down.

As said, it is frequent the case that the cutting plane is at a portion of the 3D reconstruction 76 of the welding joint 19 where said 3D reconstruction 76 is incomplete. In this case, advantageously, the upper portion of the 3D reconstruction 76 of the welding joint 19 is projected (orthogonal projection) on the cutting plane.

To clearly describe the subsequent steps of the method according to the invention, applicable for a generic shape of welding joint 19, i.e. for any welding joint 19, the following assumptions or premises are made:

- the 3D vision device or system, which generates the 3D reconstruction 76, is positioned perpendicular to the welding joint 19, i.e. the 3D vision device or system has a vertical optical axis (symmetry of acquisition);
- a pair of conducting elements of a hairpin which are perfectly aligned with the vertical axis (symmetry of acquisition); and
- a welding joint 19 with a perfectly hemispherical shape.

FIGS. 6A, 7A and 8A show the 3D drawings of respective welding joints 19 according to the above assumptions or premises, where these welding joints 19 are placed on a support base, formed by the pair of ends of conducting elements of a hairpin 16 which is square in cross-section. If there is greater symmetry (as illustrated) the support base of the welding joint 19 is a square, while if there is lesser symmetry the support base of the welding joint 19 is a rectangle. Also for the sake of clarity of description, reference will specifically be made to a square support base. The information about the dimensions of the base circumference of the welding joint 19 and the dimensions of the square at the tip of the pair of ends of conducting elements of a hairpin 16 on which the welding joint 19 rests, can be derivatives of the diametric cross-sections of the welding joints 19. FIGS. 6C, 6F, 7B and 8C show the diametric cross-sections of the welding joints 19 illustrated in 3D in FIGS. 6A, 7A and 8A. If the support base is a square, then based on the diametric cross-sections, it is possible to classify a welding joint under one of the following three types: inscribed welding joints, poor welding joints, and excess welding joints.

With reference to FIGS. 6A to 6G, in an inscribed welding joint, the diameter of the base circumference of the welding joint 19 is equal to the side of the square at the tip of the pair of ends of conducting elements of a hairpin 16. In particular, the inscribed welding joint can generate two types of diametric cross-sections:

- with particular reference to FIGS. 6B, 6C and 6D, the diametric cross-sections characterized by the segments Sd1 and Sd2 which are the principal diameters of the base circumference of the welding joint 19, i.e. the diameter at the coupling of the conducting elements of a hairpin 16 and the diameter perpendicular thereto. In the two cases described above, the diametric cross-section of the welding joint 19 covers exactly the diametric cross-section of the pair of conducting elements of a hairpin;
- with particular reference to FIGS. 6E, 6F and 6G, the diametric cross-sections characterized by all the traceable segments except for the segments Sd1 and Sd2 above, for example the segments Sd3, Sd4, Sd5, and so on. As can be seen, each one of these segments has a greater length than the diameter of the base circumference of the welding joint 19 because it intercepts the bare area of the conducting elements of a hairpin. In this case the diametric cross-section of the welding joint 19 partially covers the diametric cross-section of the pair of conducting elements of a hairpin. Therefore, for all the diametric cross-sections except those characterized by the segments Sd1 and Sd2, an inscribed welding joint is actually a poor welding joint (see below): more poor at the diagonal of the square at the tip of the pair of ends of conducting elements of a hairpin 16, and less poor in the neighborhood of the segments Sd1 and Sd2.

With reference to FIGS. 7A to 7C, in a poor welding joint, the diameter of the base circumference of the welding joint 19 is less than the side of the square at the tip of the pair of ends of conducting elements of a hairpin 16. All the diametric cross-sections of the poor welding joint partially cover the respective diametric cross-section of the pair of ends of conducting elements of a hairpin 16.

With reference to FIGS. 8A to 8D, in an excess welding joint, the diameter of the base circumference of the welding joint 19 is greater than the side of the square at the tip of the pair of ends of conducting elements of a hairpin 16. In particular, the welding joint can be in excess in two different ways:

- the diameter of the base circumference of the welding joint 19 is greater than the side of the square at the tip of the pair of ends of conducting elements of a hairpin 16, but smaller than the diagonal of said square. In this case, some diametric cross-sections of the welding joint 19 are greater, or rather wider, than the respective diametric cross-sections of the pair of conducting elements of a hairpin, while other diametric cross-sections of the welding joint 19 are smaller, or rather narrower, than the respective diametric cross-sections of the pair of conducting elements of a hairpin. In the former situations, the welding joint is in fact in excess, and in the latter situations the welding joint is poor;

the diameter of the base circumference of the welding joint 19 is greater than the diagonal of the square at the tip of the pair of ends of conducting elements of a hairpin 16. In this case, all the diametric cross-sections of the welding joint 19 are greater, or rather wider, than the respective diametric cross-sections of the pair of conducting elements of a hairpin. This condition is necessary in order to weld the entire available surface, i.e. in order to have a substantially perfect welding joint 19.

In step 24, the plurality of 2D grayscale blob areas of step 22 is transformed, or rather converted, to a function of 2D grayscale blob areas which depends on a distance d from the peak 17 of the welding joint 19, i.e. on a distance 78 from the peak 77 of the 3D reconstruction 76 of the welding joint 19, with respect to each 2D grayscale blob area. The function of 2D grayscale blob areas is a discrete function, therefore each blob area 2D corresponds to a discrete value of said function. In other words, each value of the function of 2D grayscale blob areas corresponds to the white area at the distance d from the peak 17 of the welding joint 19, i.e. at the distance 78 from the peak 77 of the 3D reconstruction 76 of the welding joint 19.

In light of the above, which refers to theoretical ideal solutions, we can expect the function of 2D grayscale blob areas of step 24 to assume a certain value at the base 18 of the welding joint 19, i.e. at the start of the pair of conducting elements of a hairpin 16, and that this value will remain constant as the distance from the peak 17 of the welding joint 19 increases. However, there could be situations where the function of 2D grayscale blob areas begins to grow linearly at the base 18 of the welding joint 19. An example of these situations could be the situation where the welding joint is inscribed or poor, and one or both of the conducting elements of the hairpin are bent inward at the base 18 of the welding joint 19. Finally, there could be situations where the function of 2D grayscale blob areas takes a constant value starting from the base 18 of the welding joint 19 for a certain number of cutting planes, but then suddenly starts to grow linearly. An example of these situations could be the situation where one or both of the conducting elements of the hairpin are bent inward at the base 18 of the welding joint 19, and the welding joint is in excess but not capable of completely covering the bent elements in depth.

Therefore, if we create a graph of the function of 2D grayscale blob areas of the cutting planes against the increase in the distance from the peak 17 of the welding joint 19, for example where the ordinate is the 2D grayscale blob area and the abscissa is the distance from the peak 17 of the welding joint 19, we would expect to have a constant linear trend, a growing linear trend (with a relatively low angular coefficient in absolute value terms), or in rare cases the former followed by the latter, at the pair of conducting elements of a hairpin. In practice, the start point of one of these trends corresponds to the base 18 of the welding joint 19.

Assume that we are building a theoretical or ideal geometry of the welding joint 19, obtained by the rotation on the central longitudinal axis of the diametric cross-section of a welding joint. In this manner we obtain a hemisphere arranged on a cylindrical base. The formula for calculating the area of the transverse cross-sections (in this case the 2D grayscale blob areas) of a hemisphere (in this case the theoretical or ideal welding joint 19) as the distance from its top (in this case from the peak 17 of the welding joint 19) varies, is the following:

$$f(d) = 2\pi Rd - \pi d^2$$

where R is the theoretical radius of the hemisphere and d is the distance from the top, i.e. from the peak 17 of the welding joint 19.

Although they refer to the theoretical or ideal geometry of the welding joint 19 above, "theoretical or ideal" in that in real-world cases the conducting elements of hairpins do not have a circular cross-section, the graphs shown in FIGS. 9A, 9B and 9C enable us to appreciate the three zones or portions of the trend 34 of the area of the transverse cross-sections, i.e. of the 2D grayscale blob areas, which are of interest in the scope of the invention:

Zone 1 (designated with the reference numeral 35): the growth curve of the 2D grayscale blob area, indicative of the welding joint 19;

Zone 2 (designated with the reference numeral 36): a point of discontinuity in the 2D grayscale blob area, which is always present because in real-world cases Zone 1 and Zone 3 are connected with a jump or an inflexion;

Zone 3 (designated with the reference numeral 37): constant linear trend (a straight line with an angular coefficient equal to zero) or a growing linear trend (a straight line with an angular coefficient other than zero), indicative of the presence of the cross-section of the conducting elements of a hairpin in the 2D grayscale blob area, the start point of which corresponds to the base 18 of the welding joint 19.

FIG. 9A is a graph of the trend 34 of the area of the transverse cross-sections of this theoretical or ideal welding joint 19, with a hemisphere arranged on a cylindrical base, if the welding joint is inscribed. The point of interest, which corresponds to the base 18 of the welding joint 19, is the delimitation point between the welding joint (Zone 1, 35) and the wires of the hairpin (Zone 3, 37): in the example shown, it is the 17th point which, given that DeltaDistFromPeak=0.1 mm, corresponds exactly to the radius (1.7 mm) of the hemispherical welding joint. There is no point of discontinuity (Zone 2, 36). However, note that, in real-world cases, the rectangular cross-section of the conducting elements of a hairpin has the effect of a minimal point of discontinuity between the welding joint (Zone 1, 35) and the wires of the hairpin (Zone 3, 37). Note also that the graph, at the 16th point, has two values: the final value of the welding joint (Zone 1, 35) and the initial value of the wires of the hairpin (Zone 3, 37). In this 16th point, the contributions of the two values are "summed" and this generates an instability which will be described below. In real-world welding joints 19, these cases of superimposed zones are noisy and do not fully conform to either of the two zones that produce them. Therefore, the 17th point is the first point that belongs only to the wires of the hairpin (Zone 3, 37).

FIG. 9B is a graph of the trend 34 of the area of the transverse cross-sections of this theoretical or ideal welding joint 19, with a hemisphere arranged on a cylindrical base, if the welding joint is poor. The hemisphere of a poor welding joint does not have a sufficient diameter to cover all of the support base formed by the pair of conducting elements of a hairpin (the diameter of the welding joint is smaller than the diagonal of the square at the tip of the wires of the hairpin). Therefore, the transition from the welding joint (Zone 1, 35) to the wires of the hairpin (Zone 3, 37) presents an evident point of discontinuity (Zone 2, 36).

FIG. 9C is a graph of the trend 34 of the area of the transverse cross-sections of this theoretical or ideal welding joint 19, with a hemisphere arranged on a cylindrical base, if the welding joint is in excess. The hemisphere of an excess welding joint has a diameter greater than that needed to cover all of the support base formed by the pair of conducting elements of a hairpin (the diameter of the welding joint is greater than the diagonal of the square at the tip of the wires of the hairpin). Given the initial assumptions or premises (i.e. the 3D vision device or system, which generates the 3D reconstruction 76, is positioned perpendicular to the welding joint 19, and the pair of conducting elements of a hairpin is perfectly aligned with the vertical axis), an excess welding joint theoretically covers the view of the wires of a hairpin for the 3D vision device or system, which reconstructs it by vertically projecting the outermost circumference of the welding joint 19. From this it emerges that the behavior of an excess welding joint is similar to that of an inscribed welding joint, as shown in FIG. 9A and described above. Therefore there is no point of discontinuity (Zone 2, 36).

By analyzing the respective trends 34 illustrated in FIGS. 9A, 9B and 9C above, it can be seen that what characterizes Zone 3, 37 of all types of welding joint (inscribed, poor, in excess) is that Zone 3, 37 is a straight line. Therefore, in step 26, we calculate a respective first derivative of the function of 2D grayscale blob areas of the previous step 24. The formula for calculating the first derivative of the function of the areas of the transverse cross-sections, i.e. of the 2D grayscale blob areas of the cutting planes, of the theoretical or ideal cases described above, is as follows:

$$f(d) = 2\pi Rd - \pi d^2$$

$$f'(d) = 2\pi R - 2\pi d$$

where, as said, R is the theoretical radius of the hemisphere and d is the distance from the top, i.e. from the peak 17 of the welding joint 19.

FIG. 10A is a graph of the trend 38 of the first derivative of the function of the area of the transverse cross-sections of this theoretical or ideal welding joint 19, with a hemisphere arranged on a cylindrical base, if the welding joint is inscribed (equivalent to the excess welding joint case). FIG. 10B is a graph of the trend 38 of the first derivative of the function of the area of the transverse cross-sections of this theoretical or ideal welding joint 19, with a hemisphere arranged on a cylindrical base, if the welding joint is poor. As can be seen from the respective trends 38 shown in FIGS. 10A and 10B above, if we exclude Zone 2 (designated with the reference numeral 40) with its non-derivable point of discontinuity, the trend of the first derivative in Zone 3 (designated with the reference numeral 41) is always a straight line with an angular coefficient equal to zero. Using the null first derivative to identify Zone 3, 41 therefore appears to be possible.

However, in real-world cases, identifying the first point of Zone 3 is particularly insidious. In fact, in Zone 2 of the trend 43 of the first derivative of the function of the 2D grayscale blob area in real-world cases, instead of there being a point of discontinuity, there is a peak which is more or less pronounced depending on the quality of the welding joint (the more the welding joint is poor, the more the peak of the trend is pronounced). Furthermore, for obvious reasons, in real-world cases in Zone 3 of the trend 43 of the first derivative of the function of the 2D grayscale blob area in real-world cases there is never a straight line along the zero; rather, the trend 43 settles in the neighborhood of zero. As confirmation of this, FIGS. 11A and 11B show graphs of the trend of the first derivative of the function of the 2D grayscale blob area of the transverse cross-sections of a real welding joint 19, respectively for a poor welding joint and for an inscribed welding joint (equivalent to the excess welding joint case). In particular, FIG. 11A shows a graph that refers to a poor welding joint, where in Zone 2 there is a very pronounced instability peak of the trend 43 of the first derivative of the function of the 2D grayscale blob area that "delimits" the end of Zone 2 and the start of Zone 3, which corresponds to the base 18 of the welding joint 19. Therefore, in an embodiment, in step 30, we seek the characteristic instability peaks of Zone 2 of the trend 43 of the first derivative of the function of 2D grayscale blob areas, knowing that the subsequent point, or more generally one of the subsequent points, after these instability peaks corresponds to the base 18 of the welding joint 19.

These instability peaks are defined as local maximum or minimum values of the first derivative of the function of 2D grayscale blob areas.

By contrast, FIG. 11B shows a graph that refers to an excellent welding joint (inscribed or in excess), where unfortunately the peak in Zone 2 of the trend 43 of the first derivative of the function of the 2D grayscale blob area is rather unpronounced, and therefore not clearly visible. By analyzing the trend 43 shown in FIG. 11B, it emerges that it is not plausible to simply seek the peak of the first derivative of the function of the 2D grayscale blob area in Zone 2, in order to identify the start of Zone 3, which as mentioned corresponds to the base 18 of the welding joint 19. Furthermore, as can also be seen from the graph of FIG. 11B, it is not easy to understand which is the first point of Zone 3, because there is no point equal to zero and it is not an easy matter to identify the point that delimits Zone 2 from Zone 3. Therefore, in step 28, we calculate a respective second derivative of the function of 2D grayscale blob areas of the previous step 22. The formula for calculating the second derivative of the function of the areas of the transverse cross-sections, i.e. of the 2D grayscale blob areas of the cutting planes, of the theoretical or ideal cases described above, is as follows:

$$f(d) = 2\pi Rd - \pi d^2$$

$$f'(d) = 2\pi R - 2\pi d$$

$$f''(d) = -2\pi$$

where, as said, R is the theoretical radius of the hemisphere and d is the distance from the top, i.e. from the peak 17 of the welding joint 19.

The calculation of the second derivative limits the spectrum to a single curve. In fact, independently of the type of welding joint (inscribed, poor, in excess), theoretically the trend 44 of the second derivative is as illustrated in FIG. 12, where Zone 1 (designated with the reference numeral 45) is a straight line below zero, Zone 2 (designated with the reference numeral 46) is a point of discontinuity with a jump, and Zone 3 (designated with the reference numeral 47) is a straight line at zero.

With reference to the graph shown in FIG. 13A, on comparing the trend 52 of the 2D grayscale blob areas of an excellent real-world welding joint with the trend 48 of the areas of the transverse cross-sections of a theoretical or ideal welding joint with the same diameter (Zone 1 designated with the reference numeral 49, and Zone 3 designated with the reference numeral 51), a substantial difference emerges after a certain number of points. Specifically, it can be seen that the two trends 52, 48 are similar up until the 12th point (Zone 1, 49), then in the real-world trend 52 there is an inflexion around the 13th/14th point that is very reminiscent of the point of discontinuity of the theoretical or ideal trend of a poor welding joint. Therefore, with reference to the graph shown in FIG. 13B, the trend 48 of the areas of the transverse cross-sections of a theoretical or ideal poor welding joint (Zone 1 designated with the reference numeral 49, Zone 2 designated with the reference numeral 50, and Zone 3 designated with the reference numeral 51) better approximates the trend 52 of the 2D grayscale blob areas of an excellent real-world welding joint. In particular, at Zone 2, 50, the point of discontinuity of the theoretical or ideal trend 48 translates to an inflexion in the real-world trend 52. Finally, both the trend 48 of the theoretical or ideal welding joint and the trend 52 of the real-world welding joint are substantially stabilized, even if at different values.

In the example shown in FIGS. 13A and 13B, given that DeltaDistFromPeak=0.1 mm, the inflexion of the trend 52 of the real-world welding joint is between 1.3 mm and 1.4 mm from the peak 17 of the welding joint 19. With reference to the graph shown in FIG. 14, which illustrates a profile of the real-world welding joint of the graphs of FIGS. 13A and 13B, we can note that the difference in elevation between the peak 17 of the welding joint 19 and the bare area is approximately 1.37 mm, right in the range of values identified by the inflexion mentioned above. Note that the bare area of the welding joint 19 corresponds to the base 18 of that same welding joint 19.

Taking the example of a real welding joint 19 of the poor type, in the graph in FIG. 15A we can see that at the inflexion in the trend 53 of the 2D grayscale blob areas there is a pronounced peak in the trend 54 of the first derivative of the function of those same 2D grayscale blob areas, where this peak indicates Zone 2. The graph shown in FIG. 15B also introduces the trend 55 of the second derivative of the function of 2D grayscale blob areas, where we can note an intense instability, in particular a positive peak followed by a negative peak, at Zone 2. In the graph in FIG. 15C the trend 54 of the first derivative of the function of said 2D grayscale blob areas is removed, and the trend 55 of the second derivative of the function of 2D grayscale blob areas has been divided into Zone 1 (designated by the reference numeral 56), Zone 2 (designated by the reference numeral 57) and Zone 3 (designated by the reference numeral 58). Observing the above zones in FIG. 15C, we can see that Zone 1, 56 and Zone 3, 58 are not easily distinguishable. However, the instability peaks of Zone 2, 57, which delimit the separation of the other two zones, are very pronounced, and therefore clearly visible.

Therefore, from the theoretical point of view, we could simply seek the first point in the neighborhood of zero in order to identify the base 18 of the welding joint 19. However, in real-world cases, this approach is not applicable, given that it can happen that some points of Zone 1 can fall in the neighborhood of zero. Therefore, in step 30, we seek the characteristic instability peaks of Zone 2, 57 of the trend 55 of the second derivative of the function of 2D grayscale blob areas, knowing that the subsequent point, or more generally one of the subsequent points, after these instability peaks corresponds to the base 18 of the welding joint 19.

These instability peaks are defined as local maximum or minimum values of the second derivative of the function of 2D grayscale blob areas.

In light of the above, it is certain that the instability peaks of the trend 55 of the second derivative of the function of 2D grayscale blob areas correspond to Zone 2, 57. Therefore we can deduce that the points after these instability peaks are part of Zone 3, 58. In the example of a real welding joint 19 of the poor type, the same as in FIGS. 15A, 15B and 15C above, the inflexion in the trend 53 of the 2D grayscale blob areas is sharp and this has repercussions in the trend 55 of the corresponding second derivative. For example, in the graph in FIGS. 15B and 15C, the base 18 of the welding joint 19 is at the 14th point and the difference with the 13th point is marked.

However, with reference to the graph shown in FIG. 16A, by observing the trend 59 of the second derivative of the function of 2D grayscale blob areas in greater detail, we can see that the first points of Zone 3, 58 in turn have an instability, owing to the change of the trend 53 of the 2D grayscale blob areas. Rather, what is of interest for the invention is the contrary, i.e. the point where the trend 59 of the second derivative of the function of 2D grayscale blob areas begins to be constant, because this is what we expect at the pair of conducting elements of a hairpin. In practice, what we want to find is not only the first point in the neighborhood of zero after the instability peaks, but also the first point in the neighborhood of zero after the instability peaks which is followed by other points in the neighborhood of zero. This is because we expect that, once Zone 3 is reached, i.e. the conducting elements of the hairpin, the trend of the second derivative of the function of 2D grayscale blob areas can be approximated with a straight line in the neighborhood of zero. But if there is only one point after the instability peaks and it is in the neighborhood of zero but it is not followed by other points in the neighborhood of zero, for example the 14th point in the graph of FIG. 16A, then only the transition between Zone 2 and Zone 3 is identified, and so it is necessary to analyze the trend 59 of the second derivative of the function of 2D grayscale blob areas in even more depth in order to fine the first point of Zone 3, i.e. the conducting elements of the hairpin.

Therefore, advantageously, in step 32 we calculate a periodic moving average, for example with a period of 10, of the second derivative of the function of 2D grayscale blob areas, in order to force the stability of the identification of the first point inside the range that identifies the neighborhood of zero. The period for calculating the above moving average can be chosen by a human operator, therefore it can be parametrized. Obviously, the choice of the period of the moving average defines the ratio between the quality of the identification of the base 18 of the welding joint 19 and the processing time necessary for said identification: increasing the period of the moving average makes the identification more stable, but the processing slower; conversely, reducing the period of the moving average makes the processing faster, but the repeatability and confidence of the identification are negatively affected. Based on the tests conducted, a period of the moving average equal to at least 20% of the total number of points gives satisfactory results.

In practice, with reference to the graph shown in FIG. 16B, resuming the example of a period of the moving average equal to 10, starting from the 10th point, we calculate the average value of the previous 10 points in the trend 59 of the second derivative of the function of 2D grayscale blob areas. Therefore the moving average with a period of 10 at point 10 is equal to the average value of the second derivative comprised in points 1 to 10, the moving average at point 11 is equal to the average value of the second derivative comprised in points 2 to 11, and so on. As a consequence, the first point where the trend 62 of the moving average, calculated as above, falls inside the range that identifies the neighborhood of zero, defined by a positive threshold 60 and a negative threshold 61, can be considered as the start of Zone 3, which as mentioned corresponds to the base 18 of the welding joint 19.

In the example shown in FIG. 16B, the first point where the trend 62 of the moving average with a period of 10 of the second derivative of the function of 2D grayscale blob areas is close to zero is point 23 or 24 (it depends on the thresholds of the range). This point 23 or 24 represents the average of the second derivative of the function of 2D grayscale blob areas of the points from 13 to 23 or from 14 to 24. If the average value at point 23 or 24 is close to zero it means that, on average, the second derivative of the function of 2D grayscale blob areas from point 14 or 15 onward, for 10 points (1 mm), is also in a neighborhood of zero. And this is sufficient to be able to say that this is Zone 3.

Note that the need to calculate the periodic moving average, for example a period of 10, of the second derivative of the function of 2D grayscale blob areas is more marked if the welding joints 19 are pseudo-ideal. For example, with reference to the graph shown in FIG. 17, it is not possible to identify the base 18 of the welding joint 19 at the 14th point from the trend 59 of the second derivative of the function of 2D grayscale blob areas; however, despite some instabilities at the 19th and 23rd point, on average, the second derivative of the function of 2D grayscale blob areas from point 14 to point 24 is placed in a neighborhood of zero. This highlights two further advantages of calculating the periodic moving average: it prevents the seeking of the base 18 of the welding joint 19, and therefore of the elevation or height h between the peak 17 and the base 18 of the welding joint 19, from being too conditioned by the choice of the thresholds by a human operator, and it makes it possible to best manage the interference caused by the process of 3D reconstruction 76 of the welding joint 19.

As mentioned, the method for quality control of a welding joint 19 between a pair of ends of conducting elements 16 of an inductive winding of a stator according to the invention is effective for any shape of the welding joint 19. In other words, the method according to the invention is effective for any welding joint 19 that is perfectly or substantially hemispherical, perfectly or substantially semi-ellipsoidal, and any other shape that a welding joint 19 can assume.

Similarly, the method for quality control of a welding joint 19 between a pair of ends of conducting elements 16 of an inductive winding of a stator according to the invention is effective both when the 3D vision device or system, which generates the 3D reconstruction 76 of the welding joint 19, is perpendicular and when it is slightly non-perpendicular to the conducting elements of a hairpin. In fact, given the configuration and the positioning of the conducting elements of a hairpin in the inductive winding of a stator, the simultaneous checking of a plurality of welding joints 19 can entail a slight non-perpendicularity between the 3D vision device or system and some of the welding joints 19, or even of all the welding joints 19.

Obviously, the method described above for quality control of a welding joint 19 between a pair of ends of conducting elements 16 can be performed on each welding joint 19 of an inductive winding of a stator.

The present invention also relates to a data processing device or system, in short a computer, generally designated by the reference numeral 10, which comprises means 12, 14 which are configured to execute the steps described above of the method for quality control of a welding joint 19 between a pair of ends of conducting elements 16 of an inductive winding of a stator according to the invention. In particular, the computer 10 comprises a processor 12 and a memory 14. The computer 10 can be functionally connected to a 3D vision device or system which is configured to generate a 3D reconstruction 76 of the welding joint 19 to be examined and evaluated; in this case the computer 10 also comprises a module for interfacing with the 3D vision device or system, and vice versa.

The present invention also relates to a computer program that comprises instructions that, when the program is executed by a computer 10, cause the computer 10 to execute the steps described above of the method for quality control of a welding joint 19 between a pair of ends of conducting elements 16 of an inductive winding of a stator according to the invention.

The present invention also relates to a computer-readable memory medium comprising instructions which, when the instructions are executed by a computer 10, cause the computer 10 to execute the steps described above of the method for quality control of a welding joint 19 between a pair of ends of conducting elements 16 of an inductive winding of a stator according to the invention.

In practice it has been found that the present invention fully achieves the set aim and objects. In particular, it has been seen that the method for quality control of a welding joint between a pair of ends of conducting elements of an inductive winding of a stator thus conceived makes it possible to overcome the qualitative limitations of the known art, in that it makes it possible to obtain better effects than those that can be obtained with conventional solutions and/or similar effects at lower cost and with higher performance levels.

An advantage of the method for quality control of a welding joint between a pair of ends of conducting elements of an inductive winding of a stator according to the present invention consists in that it makes it possible to examine and evaluate welding joints objectively and rapidly.

Another advantage of the method for quality control of a welding joint between a pair of ends of conducting elements of an inductive winding of a stator according to the present invention consists in that it makes it possible to identify the base of the welding joint, where said welding joint begins and the unwelded surface of the pair of conducting elements ends.

Another advantage of the method for quality control of a welding joint between a pair of ends of conducting elements of an inductive winding of a stator according to the present invention consists in that it makes it possible to estimate the elevation or height h between the peak of the welding joint and the base of said welding joint.

Another advantage of the method for quality control of a welding joint between a pair of ends of conducting elements of an inductive winding of a stator according to the present invention consists in that it makes it possible to identify the base of the welding joint with sufficient stability and confidence with respect to any errors.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

In conclusion, the scope of protection of the claims shall not be limited by the explanations or by the preferred embodiments illustrated in the description by way of examples, but rather the claims shall comprise all the patentable characteristics of novelty that reside in the present invention, including all the characteristics that would be considered as equivalent by the person skilled in the art.

The disclosures in Italian Patent Application No. 102022000004301 from which this application claims priority are incorporated herein by reference.

The invention claimed is:

1. A method for quality control of a welding joint between a pair of ends of conducting elements of an inductive winding of a stator, said method being performed by a computer, comprising the steps of:

acquiring a 3D reconstruction of said welding joint;

extracting a plurality of 2D grayscale blob areas from said 3D reconstruction of said welding joint, transversely sectioning said 3D reconstruction with a plurality of cutting planes arranged at a progressive distance from a peak of said 3D reconstruction, a white area of each one of said grayscale cutting planes being one of said 2D grayscale blob areas;

converting said plurality of 2D grayscale blob areas to a function of 2D grayscale blob areas which depends on a distance from a peak of said welding joint with respect to each 2D grayscale blob area, each value of said function of 2D grayscale blob areas corresponding to said white area at said distance from said peak of said welding joint;

calculating a respective first derivative of said function of 2D grayscale blob areas;

calculating a respective second derivative of said function of 2D grayscale blob areas; and seeking instability peaks in a trend of said second derivative of said function of 2D grayscale blob areas, said instability peaks being local maximum or minimum values of said second derivative, a point that follows said instability peaks corresponding to the base of said welding joint.

2. The method according to claim 1, further comprising a step of seeking instability peaks in a trend of said first derivative of said function of 2D grayscale blob areas, said instability peaks being local maximum or minimum values of said first derivative, a point that follows said instability peaks corresponding to the base of said welding joint.

3. The method according to claim 1, further comprising a step of calculating a periodic moving average of said second derivative of said function of 2D grayscale blob areas.

4. The method according to claim 1, wherein in said step of extracting said plurality of 2D grayscale blob areas, said transverse sectioning of said 3D reconstruction continues until a sectioning level reaches, starting from a level of said peak of said 3D reconstruction, an absolute value that is greater than or equal to a maximum radius of said welding joint.

5. The method according to claim 1, wherein said step of extracting said plurality of 2D grayscale blob areas further comprises a step of perpendicularly projecting an upper portion of said 3D reconstruction of said welding joint on said cutting plane.

6. A system, comprising a memory storing instructions; a processor configured to execute the instructions to perform the steps of the method according to claim 1.

7. The system according to claim 6, wherein the system is functionally connected to a 3D vision device or a system which is configured to generate said 3D reconstruction of said welding joint.

* * * * *